US012726424B2

(12) United States Patent
Asterjadhi et al.

(10) Patent No.: US 12,726,424 B2
(45) Date of Patent: Sep. 1, 2026

(54) ERROR CORRECTION FOR INCREASED RELIABILITY OF DATA PACKETS

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Sai Yiu Duncan Ho, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 18/611,229

(22) Filed: Mar. 20, 2024

(65) Prior Publication Data

US 2025/0300916 A1 Sep. 25, 2025

(51) Int. Cl.
*H04L 43/0829* (2022.01)
*H04L 41/16* (2022.01)
*H04L 45/74* (2022.01)

(52) U.S. Cl.
CPC .......... *H04L 43/0829* (2013.01); *H04L 41/16* (2013.01); *H04L 45/74* (2013.01)

(58) Field of Classification Search
CPC ....... H04L 1/0045; H04L 41/16; H04L 45/74; H04L 69/22; H04L 43/0829; H04L 1/0061; H04W 84/12
See application file for complete search history.

(56) References Cited

U.S. PATENT DOCUMENTS

2016/0210189 A1 7/2016 Xhafa et al.
2021/0075542 A1* 3/2021 Kneckt ................. H04L 1/0061
2022/0038425 A1* 2/2022 Xu .......................... H04L 63/08
2022/0052783 A1 2/2022 Dhanasekar et al.
2022/0124033 A1* 4/2022 He .......................... H04L 45/74
2022/0294665 A1* 9/2022 Jameson ................. H04L 45/74
2023/0012998 A1* 1/2023 Xu .................... H04W 36/0064
2023/0388165 A1* 11/2023 Yu ....................... H04L 27/2602
2024/0129233 A1* 4/2024 Liu ........................ H04L 43/026
2025/0139439 A1* 5/2025 Abts ...................... G06N 3/045

OTHER PUBLICATIONS

International Search Report and Written Opinion—PCT/US2025/014438—ISA/EPO—May 16, 2025.

* cited by examiner

*Primary Examiner* — Brian D Nguyen
(74) *Attorney, Agent, or Firm* — Holland & Hart LLP/Qualcomm

(57) ABSTRACT

This disclosure provides methods, components, devices and systems for error correction for increased reliability of packets. Various aspects generally relate how a receiving wireless device may recover one or more incorrect bits of a received packet. The receiving wireless device may replace the one or more incorrect bits with expected values of the one or more incorrect bits. In some aspects, the receiving wireless device may determine the expected values for the one or more incorrect bits from one or more previously received packets, by observing changes in values associated with the one or more incorrect bits over time, or by negotiating the expected values with a transmitting device.

20 Claims, 12 Drawing Sheets

Upper Layer 408

MAC Layer 406

MSDU 420

MSDU 420

MSDU 420

MSDU 420

A-MSDU 418

MSDU 420

MSDU 420

MPDU 416

MAC Header 430

Frame Body 432

FCS 434

MAC Header 430

Frame Body 432

FCS 434

A-MPDU 414

MAC Header 430

Frame Body 432

FCS 434

MAC Header 430

Frame Body 432

FCS 434

PHY Layer 404

PPDU 412

PHY Header 422

PSDU 426

PE 428

Wireless Medium 402

PHY Header 422

BA 424

ERROR CORRECTION FOR INCREASED RELIABILITY OF DATA PACKETS

TECHNICAL FIELD

This disclosure relates generally to wireless communication and, more specifically, to error correction for increased reliability of packets such as a data packet, a packet related to management or control, one or more frames, and so on.

DESCRIPTION OF THE RELATED TECHNOLOGY

Wireless communication networks are widely deployed to provide various types of communication content such as voice, video, packet data, messaging, broadcast, and so on. Some wireless communication networks may be capable of supporting communication with multiple users by sharing the available system resources (such as time, frequency, or power). Further, a wireless communication network may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM), among other examples. Wireless communication devices may communicate in accordance with any one or more of such wireless communication technologies, and may include wireless stations (STAs), wireless access points (APs), user equipment (UEs), network entities, or other wireless nodes.

In some WLANs, a wireless device (such as an AP, a non-AP STA, a multi-link device (MLD), and so on) may receive a packet or a frame. The data packet may include one or more errors (such as incorrect values or corrupted bits), which may negatively impact the integrity or reliability of information (such as data, payloads, etc.) carried by the packet. Upon detecting the one or more errors, the wireless device may discard the packet and request retransmission, which may delay the receipt of the data, resulting in decreased data throughput, decreased network performance, and decreased user experience.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications by a first wireless device in a wireless network. The method may include receiving a packet including one or more data fields and one or more overhead fields, performing a first check on the packet, an outcome of the first check indicating an inconsistency in receiving the packet, performing a second check on a modified version of the packet in accordance with the outcome of the first check, where the modified version of the packet replaces a received value of an overhead field of the one or more overhead fields with an expected value of the overhead field, and processing the packet in accordance with an outcome of the second check.

Another innovative aspect of the subject matter described in this disclosure can be implemented in a first wireless device in a wireless network for wireless communications. The first wireless device in a wireless network may include a processing system that includes processor circuitry and memory circuitry that stores code. The processing system may be configured to cause the first wireless device in a wireless network to receive a packet including one or more data fields and one or more overhead fields, perform a first check on the packet, an outcome of the first check indicating an inconsistency in receiving the packet, perform a second check on a modified version of the packet in accordance with the outcome of the first check, where the modified version of the packet replaces a received value of an overhead field of the one or more overhead fields with an expected value of the overhead field, and process the packet in accordance with an outcome of the second check.

Another innovative aspect of the subject matter described in this disclosure can be implemented in another first wireless device in a wireless network for wireless communications. The first wireless device in a wireless network may include means for receiving a packet including one or more data fields and one or more overhead fields, means for performing a first check on the packet, an outcome of the first check indicating an inconsistency in receiving the packet, means for performing a second check on a modified version of the packet in accordance with the outcome of the first check, where the modified version of the packet replaces a received value of an overhead field of the one or more overhead fields with an expected value of the overhead field, and means for processing the packet in accordance with an outcome of the second check.

Some examples of the method and first wireless devices in a wireless network described herein may further include operations, features, means, or instructions for obtaining the expected value of the overhead field from one or more additional packets received prior to the packet.

In some examples of the method and first wireless devices in a wireless network, described herein, obtaining the expected value may include operations, features, means, or instructions for obtaining a previous value of the overhead field via the one or more additional packets, where the expected value of the overhead field may be the previous value.

In some examples of the method and first wireless devices in a wireless network described herein, obtaining the expected value may include operations, features, means, or instructions for obtaining one or more previous values of the overhead field via the one or more additional packets, where the expected value of the overhead field may be in accordance with an expected change from the one or more previous values.

Some examples of the method and first wireless devices in a wireless network, described herein may further include operations, features, means, or instructions for predicting a value of the overhead field in accordance with the one or more previous values, where the expected value of the overhead field may be the predicted value.

Some examples of the method and first wireless devices in a wireless network described herein may further include operations, features, means, or instructions for communicating with a second wireless device to negotiate one or more communication parameters for transmissions from the second wireless device to the first wireless device, where the expected value of the overhead field may be in accordance with the one or more communication parameters.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
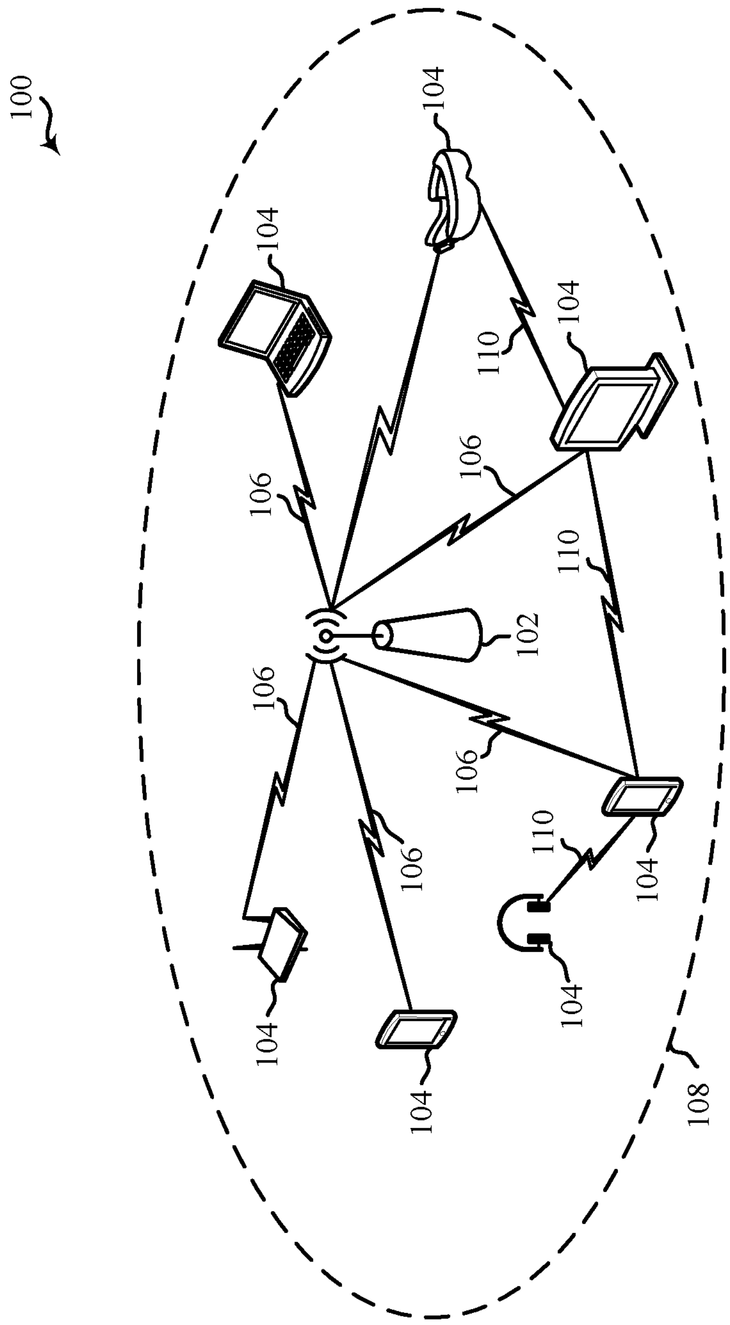
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IOT) network.

In some wireless communication networks, a receiving wireless device (such as an access point (AP, a non-AP wireless station (STA), a multi-link device (MLD), and the like) may receive a packet (such as one or more frames) from a transmitting wireless device (such as an AP, a non-AP STA, or an MLD). The packet may include one or more security or error detection fields. For example, the packet may include a frame check sequence (FCS) field for the receiving wireless device to perform a cyclic redundancy check (CRC) and detect errors (such as to determine if the packet has been decoded correctly), and/or a message integrity check (MIC) field for the receiving wireless device to perform a security or integrity check of the packet. Additionally, or alternatively, the packet may include one or more other fields (such as a CRC-16, a CRC-4, a CRC-8, parity fields, and so on) for the receiving wireless device to perform a security or integrity check of the packet. If one or more bits of the packet (such as one or more bits preceding the FCS field or the MIC field) are in error or corrupted (such as inconsistent with the corresponding one or more bits intended for transmission by the transmitting wireless device), one or both of the FCS field or the MIC field (or one or more other fields related to checking the packet) may indicate the error. That is, the receiving wireless device may perform an FCS or MIC operation on the received bits of the packet and compare a result of the FCS or MIC operation to the bits of the FCS field or the MIC field to determine if the packet has been decoded correctly and verify the integrity of the packet. If the packet has been received in error (such as if there is an inconsistency in the packet), the receiving wireless device may request retransmission of the packet from the transmitting wireless device. Such retransmissions may increase overhead, latency, and processing in the wireless communication network.

Various aspects generally relate to a method for the receiving wireless device to recover one or more bits of a packet that are corrupted or in error (such as incorrect) to correct and properly decode the received packet without requesting a retransmission. Various aspects relate more specifically to a method for the receiving wireless device to identify replace the one or more corrupted or incorrect bits with expected values of the one or more corrupted or incorrect bits. For example, the receiving wireless device may identify one or more bits in one or more overhead fields of the packet that do not match expected values, replace the identified one or more bits with their expected values, and in some examples, may rerun an FCS or MIC operation to determine if the revised packet is now correct. In some aspects, the receiving wireless device may determine (obtain, identify, ascertain, infer) the expected values of the one or more bits from previous negotiations with the transmitting wireless device or from information carried in the packet or one or more previous packets. For example, the receiving wireless device may receive the expected values for the one or more corrupted or incorrect bits via the one or more previous packets, or may determine (obtain, identify, ascertain, infer) the values for the one or more corrupted or incorrect bits based on a known or observed drift or change pattern associated with the value of fields associated with the one or more incorrect bits over time.

Particular aspects of the subject matter described in this disclosure may be implemented to realize one or more of the following potential advantages. The techniques employed by the described communication devices may provide benefits and enhancements to the operation of communicating data from a transmitting wireless device to a receiving wireless device, including relatively reduced latency, overhead, and processing. For example, operations performed by the described communication devices may decrease latency and overhead by allowing receiving wireless device to correctly decode received packets that initially fail an FCS or MIC operation, thereby reducing the retransmission rate between the transmitting wireless device and the receiving wireless device. In some implementations, operations performed by the described receiving wireless device also may support improvements to increased coordination between the receiving wireless device and the transmitting wireless device, among other benefits, by allowing devices to negotiate or otherwise obtain values of corrupted bits within packets. Increased throughput, increased reliability, reduced medium utilization and reduced power consumption are all side benefits of reduction of retransmissions over the air.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHZ, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHZ, 5 GHZ, 6 GHZ, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHZ), FR2 (24.25 GHZ-52.6 GHZ), FR3 (7.125 GHZ-24.25 GHZ), FR4a or FR4-1 (52.6 GHz-71 GHZ), FR4 (52.6 GHz-114.25 GHZ), and FR5 (114.25 GHz-300 GHZ).

Each of the frequency bands may include multiple sub-bands and frequency channels (also referred to as subchannels). The terms "channel" and "subchannel" may be used interchangeably herein, as each may refer to a portion of frequency spectrum within a frequency band (such as a 20 MHz, 40 MHZ, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHZ, 160 MHZ, 240 MHZ, 320 MHz, 480 MHz, or 640 MHz by bonding together multiple 20 MHz channels.

An AP 102 may determine or select an operating or operational bandwidth for the STAs 104 in its BSS and select a range of channels within a band to provide that operating bandwidth. For example, the AP 102 may select sixteen 20 MHz channels that collectively span an operating bandwidth of 320 MHz. Within the operating bandwidth, the AP 102 may typically select a single primary 20 MHz channel on which the AP 102 and the STAs 104 in its BSS monitor for contention-based access schemes. In some examples, the AP 102 or the STAs 104 may be capable of monitoring only a single primary 20 MHz channel for packet detection (such as for detecting preambles of PPDUs). Conventionally, any transmission by an AP 102 or a STA 104 within a BSS must involve transmission on the primary 20 MHz channel. As such, in conventional systems, the transmitting device must contend on and win a TXOP on the primary channel to transmit anything at all. However, some APs 102 and STAs 104 supporting ultra-high reliability (UHR) communications or communication according to the IEEE 802.11bn standard amendment can be configured to operate, monitor, contend and communicate using multiple primary 20 MHz channels. Such monitoring of multiple primary 20 MHz channels may be sequential such that responsive to determining, ascertaining or detecting that a first primary 20 MHz channel is not available, a wireless communication device may switch to monitoring and contending using a second primary 20 MHz channel. Additionally, or alternatively, a wireless communication device may be configured to monitor multiple primary 20 MHz channels in parallel. In some examples, a first primary 20 MHz channel may be referred to as a main primary (M-Primary) channel and one or more additional, second primary channels may each be referred to as an opportunistic primary (O-Primary) channel. For example, if a wireless communication device measures, identifies, ascertains, detects, or otherwise determines that the M-Primary channel is busy or occupied (such as due to an overlapping BSS (OBSS) transmission), the wireless communication device may switch to monitoring and contending on an O-Primary channel. In some examples, the M-Primary channel may be used for beaconing and serving legacy client devices and an O-Primary channel may be specifically used by non-legacy (such as UHR- or IEEE 802.11bn-compatible) devices for opportunistic access to spectrum that may be otherwise under-utilized.

Figure 2:
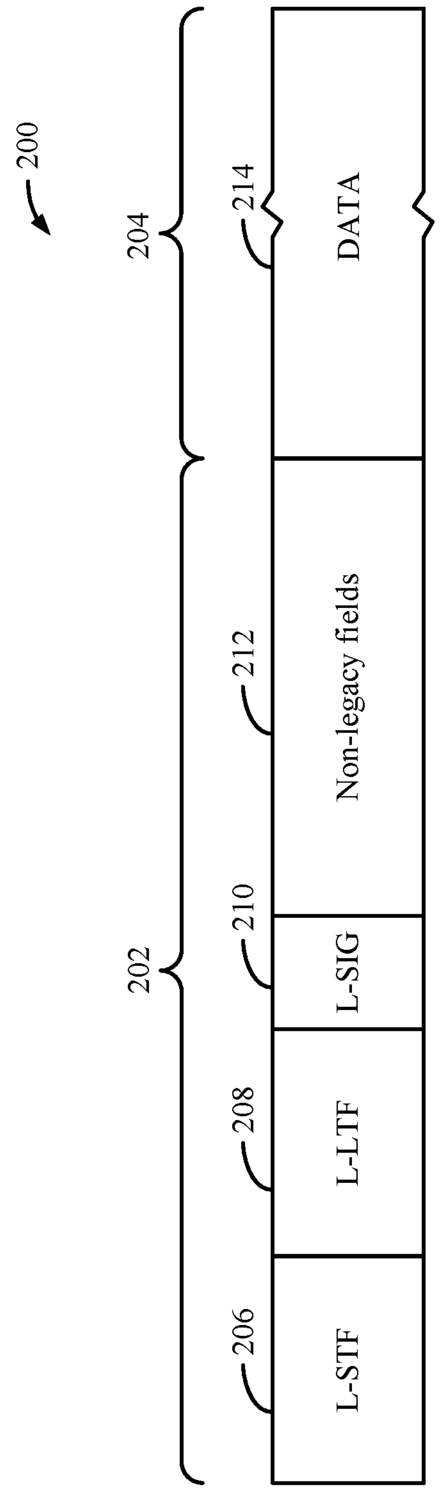
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (such as obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

In some examples, techniques described herein may enable a receiving device to recover one or more bits of a packet (such as one or more bits in a PDU 200) that are corrupted or in error (such as incorrect). Various aspects relate more specifically to a method for the receiving device to replace the one or more corrupted or incorrect bits with known values of the one or more corrupted or incorrect bits. In some aspects, the receiving device may have predetermined values of the one or more corrupted or incorrect bits. In some aspects, the receiving device may determine values for the one or more corrupted or incorrect bits (such as by negotiating values with a transmitting device, by obtaining the values based on other information carried in the packet or one or more previous packets).

Figure 3:
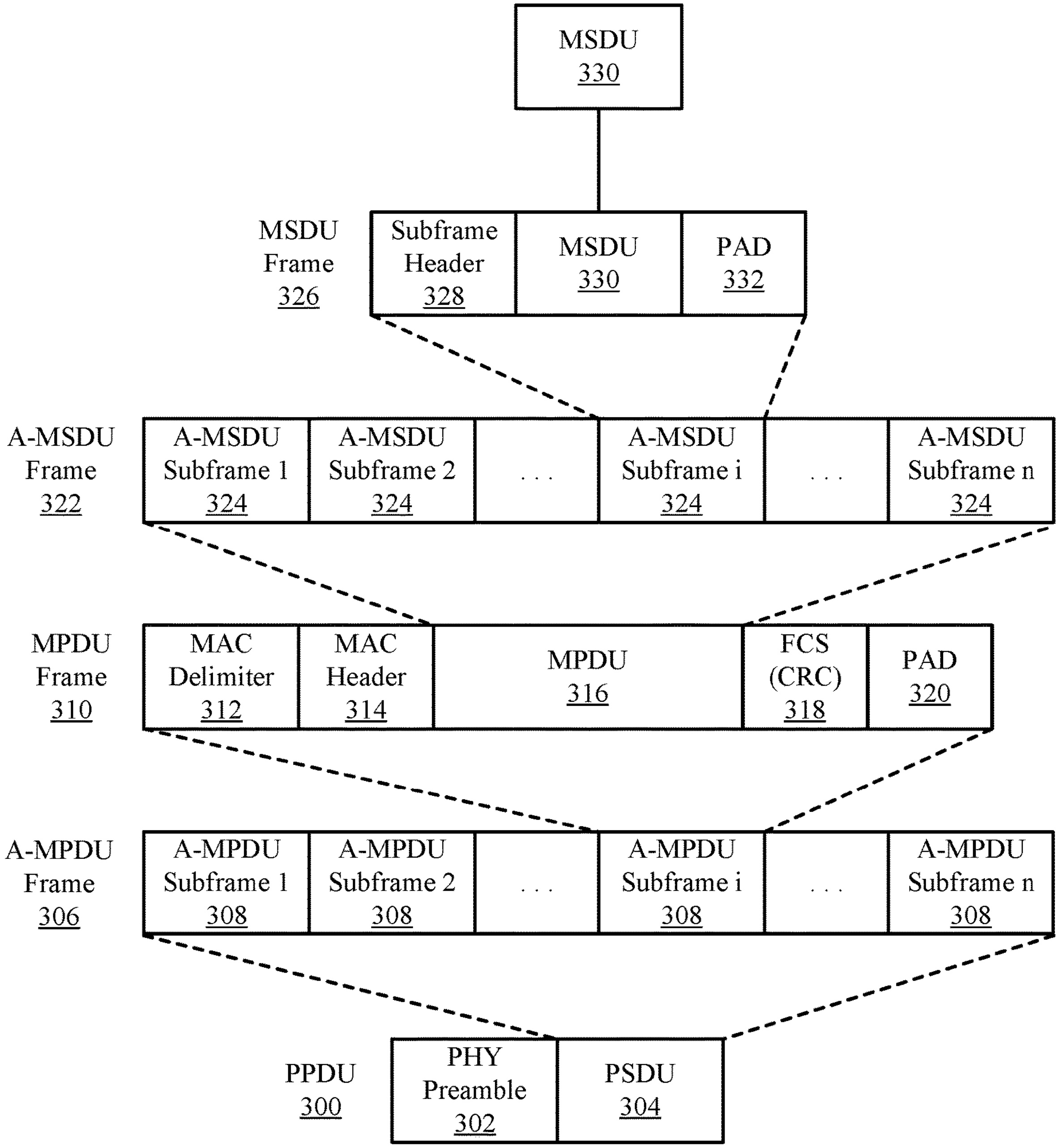
FIG. 3 shows a hierarchical format of an example PPDU usable for communications between a wireless AP and one or more wireless STAs.

FIG. 3 shows a hierarchical format of an example PPDU usable for communications between a wireless AP and one or more wireless STAs. For example, the AP and STAs may be examples of the AP 102 and the STAs 104 described with reference to FIG. 1. As described, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 308 may include an MPDU frame 310 that includes a MAC delimiter 312 and a MAC header 314 prior to the accompanying MPDU 316, which includes the data portion ("payload" or "frame body") of the MPDU frame 310. Each MPDU frame 310 also may include a frame check sequence (FCS) field 318 for error detection (such as the FCS field 318 may include a cyclic redundancy check (CRC)) and padding bits 320. The MPDU 316 may carry one or more MAC service data units (MSDUs) 330. For example, the MPDU 316 may carry an aggregated MSDU (A-MSDU) 322 including multiple A-MSDU subframes 324. Each A-MSDU subframe 324 may be associated with an MSDU frame 326 and may contain a corresponding MSDU 330 preceded by a subframe header 328 and, in some examples, followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body. The MAC header 314 includes a duration field indicating a duration extending from the end of the PPDU until at least the end of an acknowledgement (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 314 also includes one or more fields indicating addresses for the data encapsulated within the frame body. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

In some wireless communication systems, wireless communication between an AP 102 and an associated STA 104 can be secured. For example, either an AP 102 or a STA 104 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (such as by generating a message integrity check (MIC) for one or more relevant fields.

Retransmission protocols, such as hybrid automatic repeat request (HARQ), also may offer performance gains. A HARQ protocol may support various HARQ signaling between transmitting and receiving wireless communication devices (such as the AP 102 and the STAs 104 described with reference to FIG. 1) as well as signaling between the PHY and MAC layers to improve the retransmission operations in a wireless communication network. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a wireless communication network may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (such as a negative acknowledgment (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an automatic repeat request (ARQ) protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

In some implementations, the AP 102 and STAs 104 can support various multi-user communications; that is, concurrent transmissions from one device to each of multiple devices (such as multiple simultaneous downlink communications from an AP 102 to corresponding STAs 104), or concurrent transmissions from multiple devices to a single device (such as multiple simultaneous uplink transmissions from corresponding STAs 104 to an AP 102). As an example, in addition to MU-MIMO, the AP 102 and STAs 104 may support OFDMA. OFDMA is in some aspects a multi-user version of OFDM.

In OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone and 996 tone RUs. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

In some wireless communications systems, an AP 102 may allocate or assign multiple RUs to a single STA 104 in an OFDMA transmission (hereinafter also referred to as "multi-RU aggregation"). Multi-RU aggregation, which facilitates puncturing and scheduling flexibility, may ultimately reduce latency. As increasing bandwidth is supported by emerging standards (such as the IEEE 802.11be standard amendment supporting 320 MHz and the IEEE 802.11bn standard amendment supporting 480 MHZ and 640 MHZ), various multiple RU (multi-RU) combinations may exist. Values indicating the various multi-RU combinations may be provided by a suitable standard specification (such as one or more of the IEEE 802.11 family of wireless communication protocol standards including the 802.11be standard amendment and the 802.11bn standard amendment).

As Wi-Fi is not the only technology operating in the 6 GHz band, the use of multiple RUs in conjunction with channel puncturing may enable the use of large bandwidths such that high throughput is possible while avoiding transmitting on frequencies that are locally unauthorized due to incumbent operation. Puncturing may be used in conjunction with multi-RU transmissions to enable wide channels to be established using non-contiguous spectrum blocks. In such examples, the portion of the bandwidth between two RUs allocated to a particular STA 104 may be punctured. Accordingly, spectrum efficiency and flexibility may be increased.

As described previously, STA-specific RU allocation information may be included in a signaling field (such as the EHT-SIG field for an EHT PPDU) of the PPDU's preamble. Preamble puncturing may enable wider bandwidth transmissions for increased throughput and spectral efficiency in the presence of interference from incumbent technologies and other wireless communication devices. Because RUs may be individually allocated in a MU PPDU, use of the MU PPDU format may indicate preamble puncturing for SU transmissions. While puncturing in the IEEE 802.11ax standard amendment was limited to OFDMA transmissions, the IEEE 802.11be standard amendment extended puncturing to SU transmissions. In some examples, the RU allocation information in the common field of EHT-SIG can be used to individually allocate RUs to the single user, thereby avoiding the punctured channels. In some other examples, U-SIG may be used to indicate SU preamble puncturing. For example, the SU preamble puncturing may be indicated by a value of the EHT-SIG compression field in U-SIG.

Some APs and STAs, such as, for example, the AP 102 and STAs 104 described with reference to FIG. 1, are capable of multi-link operation (MLO). For example, the AP 102 and STAs 104 may support MLO as defined in one or both of the IEEE 802.11be and 802.11bn standard amendments. An MLO-capable device may be referred to as a multi-link device (MLD). In some examples, MLO supports establishing multiple different communication links (such as a first link on the 2.4 GHZ band, a second link on the 5 GHz band, and the third link on the 6 GHz band) between MLDs. Each communication link may support one or more sets of channels or logical entities. For example, an AP MLD may set, for each of the communication links, a respective operating bandwidth, one or more respective primary channels, and various BSS configuration parameters. An MLD may include a single upper MAC entity, and can include, for example, three independent lower MAC entities and three associated independent PHY entities for respective links in the 2.4 GHZ, 5 GHZ, and 6 GHz bands. This architecture may enable a single association process and security context. An AP MLD may include multiple APs 102 each configured to communicate on a respective communication link with a respective one of multiple STAs 104 of a non-AP MLD (also referred to as a "STA MLD").

To support MLO techniques, an AP MLD and a STA MLD may exchange MLO capability information (such as supported aggregation types or supported frequency bands, among other information). In some examples, the exchange of information may occur via a beacon frame, a probe request frame, a probe response frame, an association request frame, an association response frame, another management frame, a dedicated action frame, or an operating mode indicator (OMI), among other examples. In some examples, an AP MLD may designate a specific channel of one link in one of the bands as an anchor channel on which it transmits beacons and other control or management frames periodically. In such examples, the AP MLD also may transmit shorter beacons (such as ones which may contain less information) on other links for discovery or other purposes.

MLDs may exchange packets on one or more of the communications links dynamically and, in some instances, concurrently. MLDs also may independently contend for access on each of the communication links, which achieves latency reduction by enabling the MLD to transmit its packets on the first communication link that becomes available. For example, "alternating multi-link" may refer to an MLO mode in which an MLD may listen on two or more different high-performance links and associated channels concurrently. In an alternating multi-link mode of operation, an MLD may alternate between use of two links to transmit portions of its traffic. Specifically, an MLD with buffered traffic may use the first link on which it wins contention and obtains a TXOP to transmit the traffic. While such an MLD may in some examples be capable of transmitting or receiving on only one communication link at any given time, having access opportunities via two different links enables the MLD to avoid congestion, reduce latency, and maintain throughput.

Multi-link aggregation (MLA) (which also may be referred to as carrier aggregation (CA)) is another MLO mode in which an MLD may simultaneously transmit or receive traffic to or from another MLD via multiple communication links in parallel such that utilization of available resources may be increased to achieve higher throughput. That is, during at least some duration of time, transmissions or portions of transmissions may occur over two or more communication links in parallel at the same time. In some examples, the parallel communication links may support synchronized transmissions. In some other examples, or during some other durations of time, transmissions over the communication links may be parallel, but not be synchronized or concurrent. Additionally, in some examples or durations of time, two or more of the communication links may be used for communications between MLDs in the same direction (such as all uplink or all downlink), while in some other examples or durations of time, two or more of the communication links may be used for communications in different directions (such as one or more communication links may support uplink communications and one or more communication links may support downlink communications). In such examples, at least one of the MLDs may operate in a full duplex mode.

MLA may be packet-based or flow-based. For packet-based aggregation, frames of a single traffic flow (such as all traffic associated with a given traffic identifier (TID)) may be transmitted concurrently across multiple communication links. For flow-based aggregation, each traffic flow (such as all traffic associated with a given TID) may be transmitted using a single respective one of multiple communication links. As an example, a single STA MLD may access a web browser while streaming a video in parallel. Per the above example, the traffic associated with the web browser access may be communicated over a first communication link while the traffic associated with the video stream may be communicated over a second communication link in parallel (such that at least some of the data may be transmitted on the first channel concurrently with data transmitted on the second channel). In some other examples, MLA may be implemented with a hybrid of flow-based and packet-based aggregation. For example, an MLD may employ flow-based aggregation in situations in which multiple traffic flows are created and may employ packet-based aggregation in other situations. Switching among the MLA techniques or modes may additionally, or alternatively, be associated with other metrics (such as a time of day, traffic load within the network, or battery power for a wireless communication device, among other factors or considerations).

Other MLO techniques may be associated with traffic steering and quality of service (QOS) characterization, which may achieve latency reduction and other QoS enhancements by mapping traffic flows having different latency or other requirements to different links. For example, traffic with low latency requirements may be mapped to communication links operating in the 6 GHz band and more latency-tolerant flows may be mapped to communication links operating in the 2.4 GHz or 5 GHz bands. Such an operation, referred to as TID-to-Link mapping (TTLM), may enable two MLDs to negotiate mapping of certain traffic flows in the DL direction or the UL direction or both directions to one or more set of communication links set up between them. In some examples, an AP MLD may advertise a global TTLM that applies to all associated non-AP MLDs. A communication link that has no TIDs mapped to it in either direction is referred to as a disabled link. An enabled link has at least one TID mapped to it in at least one direction.

In some examples, an MLD may include multiple radios and each communication link associated with the MLD may be associated with a respective radio of the MLD. Each radio may include one or more of its own transmit/receive (Tx/Rx) chains, include or be coupled with one or more of its own physical antennas or shared antennas, and include signal processing components, among other components. An MLD with multiple radios that may be used concurrently for MLO may be referred to as a multi-link multi-radio (MLMR) MLD. Some MLMR MLDs may further be capable of an enhanced MLMR (eMLMR) mode of operation, in which the MLD may be capable of dynamically switching radio resources (such as antennas or RF frontends) between multiple communication links (such as switching from using radio resources for one communication link to using the radio resources for another communication link) to enable higher transmission and reception using higher capacity on a given communication link. In this eMLMR mode of operation, MLDs may be able to move Tx/Rx radio resources from one communication link to another link, thereby increasing the spatial stream capability of the other communication link. For example, if a non-AP MLD includes four or more STAs, the STAs associated with the eMLMR links may "pool" their antennas so that each of the STAs can utilize the antennas of other STAs when transmitting or receiving on one of the eMLMR links.

Other MLDs may have more limited capabilities and not include multiple radios. An MLD with only a single radio that is shared for multiple communication links may be referred to as a multi-link single radio (MLSR) MLD. Control frames may be exchanged between MLDs before initiating data or management frame exchanges between the MLDs in cases in which at least one of the MLDs is operating as an MLSR MLD. Because an MLD operating in the MLSR mode is limited to a single radio, it cannot use multiple communication links simultaneously and may instead listen to (such as monitor), transmit or receive on only a single communication link at any given time. An MLSR MLD may instead switch between different bands in a TDM manner. In contrast, some MLSR MLDs may further be capable of an enhanced MLSR (eMLSR) mode of operation, in which the MLD can concurrently listen on multiple links for specific types of packets, such as buffer status report poll (BSRP) frames or multi-user (MU) request-to-send (RTS) (MU-RTS) frames. Although an MLD operating in the eMLSR mode can still transmit or receive on only one of the links at any given time, it may be able to dynamically switch between bands, resulting in improvements in both latency and throughput. For example, when the STAs of a non-AP MLD may detect a BSRP frame on their respective communication links, the non-AP MLD may tune all of its antennas to the communication link on which the BSRP frame is detected. By contrast, a non-AP MLD operating in the MLSR mode can only listen to, and transmit or receive on, one communication link at any given time.

An MLD that is capable of simultaneous transmission and reception on multiple communication links may be referred to as a simultaneous transmission and reception (STR) device. In a STR-capable MLD, a radio associated with a communication link can independently transmit or receive frames on that communication link without interfering with, or without being interfered with by, the operation of another radio associated with another communication link of the MLD. For example, an MLD with a suitable filter may simultaneously transmit on a 2.4 GHZ band and receive on a 5 GHz band, or vice versa, or simultaneously transmit on the 5 GHz band and receive on the 6 GHz band, or vice versa, and as such, be considered a STR device for the respective paired communication links. Such an STR-capable MLD may generally be an AP MLD or a higher-end STA MLD having a higher performance filter. An MLD that is not capable of simultaneous transmission and reception on multiple communication links may be referred to as a non-STR (NSTR) device. A radio associated with a given communication link in an NSTR device may experience interference when there is a transmission on another communication link of the NSTR device. For example, an MLD with a standard filter may not be able to simultaneously transmit on a 5 GHz band and receive on a 6 GHz band, or vice versa, and as such, may be considered a NSTR device for those two communication links.

In some wireless communication systems, an MLD may include multiple non-collocated entities. For example, an AP MLD may include non-collocated AP devices and a STA MLD may include non-collocated STA devices. In examples in which an AP MLD includes multiple non-collocated AP devices, a single mobility domain (SMD) entity may refer to a logical entity that controls the associated non-collocated APs. A non-AP STA (such as a non-MLD non-AP STA or a non-AP MLD that includes one or more associated non-AP STAs) may associate with the SMD entity via one of its constituent APs and may seamlessly roam (such as without requiring reassociation) between the APs associated with the SMD entity. The SMD entity also may maintain other context (such as security and Block ACK) for non-AP STAs associated with it.

The afore-mentioned and related MLO techniques may provide multiple benefits to a wireless communication network 100. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the "on" time of a modem, which may benefit a wireless communication device in terms of power consumption. Another benefit of MLO is the increased multiplexing opportunities in the case of a single BSS. For example, MLA may increase the number of users per multiplexed transmission served by the multi-link AP MLD.

In some environments, locations, or conditions, a regulatory body may impose a power spectral density (PSD) limit for one or more communication channels or for an entire band (such as the 6 GHz band). A PSD is a measure of transmit power as a function of a unit bandwidth (such as per 1 MHZ). The total transmit power of a transmission is consequently the product of the PSD and the total bandwidth by which the transmission is sent. Unlike the 2.4 GHz and 5 GHz bands, the United States Federal Communications Commission (FCC) has established PSD limits for low power devices when operating in the 6 GHz band. The FCC has defined three power classes for operation in the 6 GHz band: standard power, low power indoor, and very low power. Some APs 102 and STAs 104 that operate in the 6 GHz band may conform to the low power indoor (LPI) power class, which limits the transmit power of APs 102 and STAs 104 to 5 decibel-milliwatts per megahertz (dBm/MHz) and −1 dBm/MHz, respectively. In other words, transmit power in the 6 GHz band is PSD-limited on a per-MHz basis.

Such PSD limits can undesirably reduce transmission ranges, reduce packet detection capabilities, and reduce channel estimation capabilities of APs 102 and STAs 104. In some examples in which transmissions are subject to a PSD limit, the AP 102 or the STAs 104 of a wireless communication network 100 may transmit over a greater transmission bandwidth to allow for an increase in the total transmit power, which may increase an SNR and extend coverage of the wireless communication devices. For example, to overcome or extend the PSD limit and improve SNR for low power devices operating in PSD-limited bands, 802.11be introduced a duplicate (DUP) mode for a transmission, by which data in a payload portion of a PPDU is modulated for transmission over a "base" frequency sub-band, such as a first RU of an OFDMA transmission, and copied over (such as duplicated) to another frequency sub-band, such as a second RU of the OFDMA transmission. In DUP mode, two copies of the data are to be transmitted, and, for each of the duplicate RUs, using dual carrier modulation (DCM), which also has the effect of copying the data such that two copies of the data are carried by each of the duplicate RUs, so that, for example, four copies of the data are transmitted. While the data rate for transmission of each copy of the user data using the DUP mode may be the same as a data rate for a transmission using a "normal" mode, the transmit power for the transmission using the DUP mode may be essentially multiplied by the number of copies of the data being transmitted, at the expense of requiring an increased bandwidth. As such, using the DUP mode may extend range but reduce spectrum efficiency.

In some other examples in which transmissions are subject to a PSD limit, a distributed tone mapping operation may be used to increase the bandwidth via which a STA 104 transmits an uplink communication to the AP 102. As used herein, the term "distributed transmission" refers to a PPDU transmission on noncontiguous tones (or subcarriers) of a wireless channel. In contrast, the term "contiguous transmission" refers to a PPDU transmission on contiguous tones. As used herein, a logical RU represents a number of tones or subcarriers that are allocated to a given STA 104 for transmission of a PPDU. As used herein, the term "regular RU" (or rRU) refers to any RU or MRU tone plan that is not distributed, such as a configuration supported by 802.11be or earlier versions of the IEEE 802.11 family of wireless communication protocol standards. As used herein, the term "distributed RU" (or dRU) refers to the tones distributed across a set of noncontiguous subcarrier indices to which a logical RU is mapped. The term "distributed tone plan" refers to the set of noncontiguous subcarrier indices associated with a dRU. The channel or portion of a channel within which the distributed tones are interspersed is referred to as a spreading bandwidth, which may be, for example, 40 MHz, 80 MHz or more. The use of dRUs may be limited to uplink communications because benefits to addressing PSD limits may only be present for uplink communications.

In some examples, techniques described herein may enable a receiving device to recover one or more bits of a packet (such as one or more bits in a PPDU 300) that are corrupted or in error (such as incorrect). Various aspects relate more specifically to a method for the receiving device to replace the one or more corrupted or incorrect bits with known values of the one or more corrupted or incorrect bits. In some aspects, the receiving device may have predetermined values of the one or more corrupted or incorrect bits. In some aspects, the receiving device may determine values for the one or more corrupted or incorrect bits (such as by negotiating values with a transmitting device, by obtaining the values based on other information carried in the packet or one or more previous packets). Such techniques are described in further detail with reference to FIGS. 4-7.

In some examples, a receiving wireless device (such as an AP 102, a non-AP STA 104, an MLD) may recover one or more bits of a packet that are corrupted or in error (such as inconsistent or mismatched). Various aspects relate more specifically to a method for the receiving wireless device to replace the one or more corrupted or incorrect bits with expected values of the one or more corrupted or incorrect bits if the one or more corrupted or incorrect bits are in an overhead portion of the packet. As described herein, an overhead portion of a packet may include one or more fields other than data/information fields. For example, an overhead portion may include one or more of frame headers, padding, redundancy fields, signaling added by a communication (such as TCP/IP) stack (including but not limited to link layer, a MAC layer, a PHY layer, an application layer or other upper layer, reserved bits, or other fields that provide metadata, control signaling, or auxiliary bits to accompany the user or application data carried by the packet). In some examples, the overhead fields may include one or more fields of an internet protocol (IP) frame, such as user datagram protocol (UDP) or overhead introduced due to low latency low loss scalable throughput (L4S). In other words, in some implementations, an overhead field may refer to any field or portion of the packet that carries information other than user or application layer information.

In some aspects, the receiving wireless device may determine (such as obtain, identify, ascertain, or infer) expected values for the one or more corrupted or incorrect bits by negotiating values with a transmitting device or by obtaining the values based on other information carried in the packet or one or more previous packets. For example, the receiving wireless device may receive the expected values for the one or more corrupted or incorrect bits via the one or more previous packets, or may determine (such as obtain, identify, ascertain, or infer) the expected values for the one or more corrupted or incorrect bits based on values in the one or more previous packets changing with time (such as changing slowly).

Figure 4:
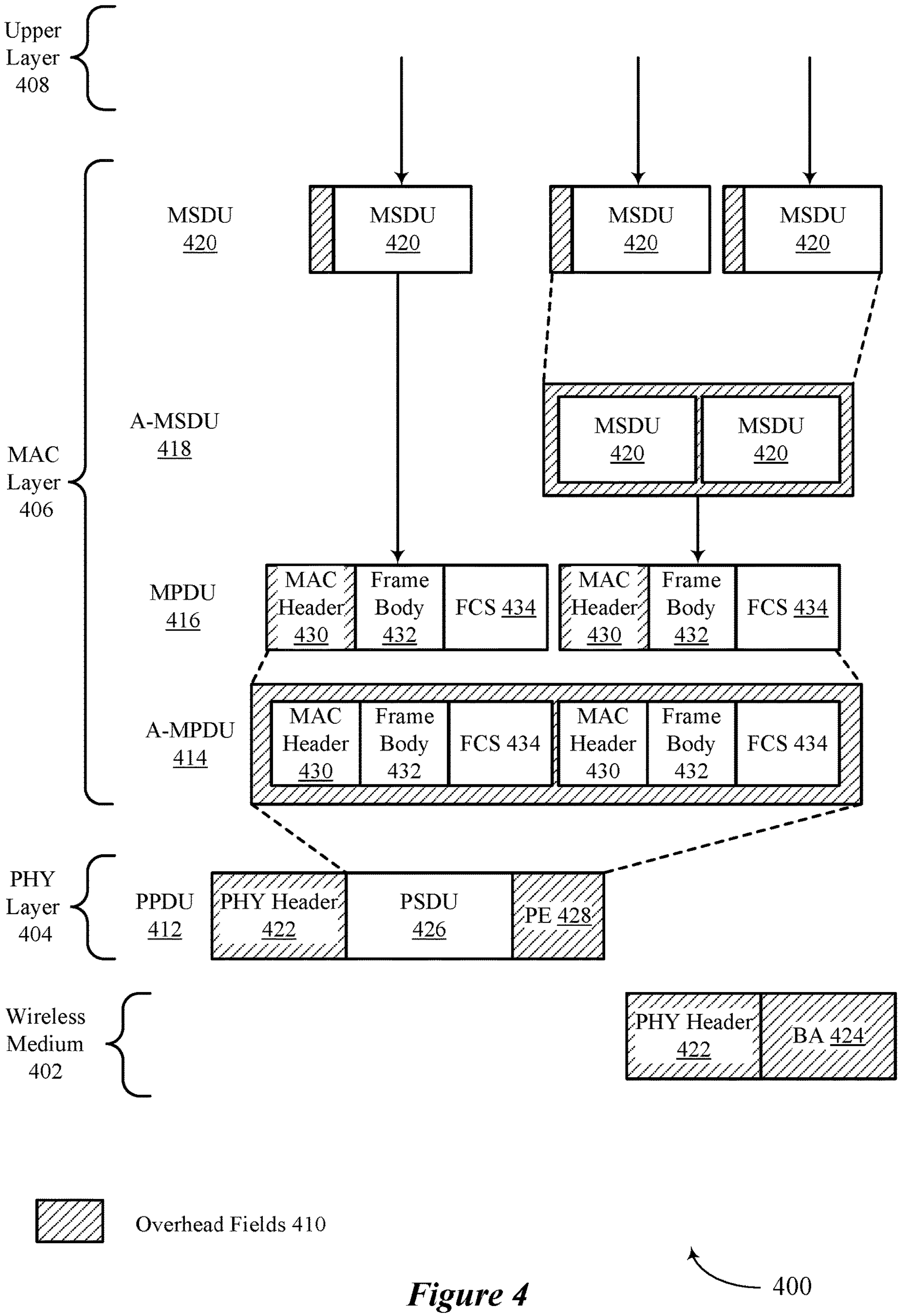
FIG. 4 shows an example of a packet structure that supports error correction for increased reliability of packets.

FIG. 4 shows an example of a packet structure 400 that supports error correction for increased reliability of packets. The packet structure 400 may implement or may be implemented by aspects of the wireless communication network 100, the PDU 200, or the PPDU 300. For example, the packet structure 400 may be implemented by an AP 102, an STA 104, an MLD, and the like, which may be examples of the corresponding devices as described with reference to FIG. 1.

In some wireless communication systems, a transmitting device may transmit a packet to a receiving wireless device (such as an AP, a non-AP STA, an MLD, and the like). Some systems (such as IOT, low latency applications) may exchange relatively shorter packets than some other systems (such as with sized between 20-250 bytes) and with relatively lower data rates (such as extended rate (ER) PPDUs with target rates of approximately 1 megabits per second (Mbps) or downlink and uplink OFDMA with target rates of approximately 400 kilobits per second (kbps)). Such low data rate techniques may lead to higher over-the-air transmission times (even for the relatively shorter payload packets), for example due to PHY, MAC, or security headers, padding, and so on. Such higher over-the-air times may increase a likelihood of packet errors (such as even if a payload of the packet is correct).

In some examples, the packet (such as MPDUs 416 of the packet) may be protected by an FCS and/or an MIC. That is, the receiving wireless device may perform a check on a packet (such as a MIC to ensure integrity of a frame body of the packet using an MIC field of the packet, a CRC to detect errors in the MPDU 416 using an FCS field of the packet). In some examples, if any preceding bits of an MPDU 416 are in error, the CRC using the FCS may be unsuccessful. In some examples, if any bits of a frame body are corrupted, the MIC may be unsuccessful. The MIC may be successful if bits outside of the frame body (such as bits in a QoS Control field, a high throughput (HT) Control fields, or one or more other fields of a MAC header 430 of the MPDU 416) are corrupted (such as if no bits in the frame body are corrupted). Accordingly, a successful MIC and an unsuccessful FIC may indicate that the MAC header 430 is corrupted. Thus, from a payload perspective, the receiving wireless device may ignore an FCS fail and may determine (such as obtain, identify, ascertain, or infer) that the successful MIC is indicative of an uncorrupted payload.

In some examples, if the receiving wireless device that the check is unsuccessful, the receiving wireless device may request retransmission of the packet. Such techniques may result in increased overhead and latency in the system. Accordingly, techniques described herein may allow the receiving wireless device to use information known or obtainable (such as in advance of receiving the packet) by the receiving wireless device for error correction. Known or obtainable information may be referred to herein as information included in overhead fields 410. Such techniques may enable the receiving wireless device to successfully obtain a payload meant for the receiving wireless device. In some examples, if the packet is not meant for the receiving wireless device, the receiving wireless device may use the packet or the obtainable information to set a NAV.

In some aspects, the receiving wireless device may communicate with the transmitting device (such as prior to receiving the packet) to negotiate one or more values of overhead fields 410 (such as in management-based exchanges). In some aspects, the receiving wireless device may know values of the overhead fields 410. In some aspects, the receiving wireless device may obtain values of the overhead fields 410 based on one or more previous values of the overhead fields 410 (such as received in one or more previous packets). For example, values of the overhead fields 410 may be the same as the one or more previous values, or may change (such as change slowly with time) relative to the one or more previous values. In some examples, if the values of the overhead fields 410 change slowly with time, the receiving wireless device may determine (such as obtain, identify, ascertain, or infer) that one or more bits of the overhead fields 410 (such as one or more most significant bits) may be the same as one or more bits received in the previous packets.

Certain aspects and techniques as described herein may be implemented, at least in part, using an artificial intelligence (AI) program, such as a program that includes a machine learning (ML) or artificial neural network (ANN) model. For example, the receiving wireless device may determine (such as obtain, identify, ascertain, or infer) that one or more values of overhead fields 410 in a set of received packets may change with time (such as slowly). The receiving wireless device may use an ML model to determine (such as obtain, identify, ascertain, or infer) expected values for the overhead fields 410 by inputting one or more previous values of the overhead fields 410 (such as values received in one or more previous packets) into the ML model and obtaining the expected values as an output from the ML model.

An example ML model may include mathematical representations or define computing capabilities for making inferences from input data based on patterns or relationships identified in the input data. As used herein, the term "inferences" can include one or more of decisions, predictions, determinations, or values, which may represent outputs of the ML model. The computing capabilities may be defined in terms of certain parameters of the ML model, such as weights and biases. Weights may indicate relationships between certain input data and certain outputs of the ML model, and biases are offsets which may indicate a starting point for outputs of the ML model. An example ML model operating on input data may start at an initial output based on the biases and then update its output based on a combination of the input data and the weights.

In some aspects, an ML model may be configured to provide computing capabilities for wireless communications. Such an ML model may be configured with weights and biases to perform prediction of one or more overhead field values in a received packet (such as a data packet, a packet related to management or control, one or more frames, and so on) and thus to correct error. Thus, during operation of a device, the ML model may receive input data (such as one or more previous values of the one or more overhead fields received in one or more previous packets) and make inferences (such as one or more predicted values for the one or more overhead fields) based on the weights and biases.

ML models may be deployed in one or more devices (such as APs, non-AP STAs, MLDs and the like) and may be configured to enhance various aspects of a wireless communication system. For example, an ML model may be trained to identify patterns or relationships in data corresponding to a network, a device, an air interface, or the like. An ML model may support operational decisions relating to one or more aspects associated with wireless communications devices, networks, or services. For example, an ML model may be utilized for supporting or improving aspects such as signal coding/decoding, network routing, energy conservation, transceiver circuitry controls, frequency synchronization, timing synchronization channel state estimation, channel equalization, channel state feedback, modulation, demodulation, device positioning, beamforming, load balancing, operations and management functions, security, etc.

In some aspects, overhead fields 410 of the packet (such as fields for which the receiving wireless device may determine expected values) may include fields in one or more frames generated by one or more layers (such as layers of the transmitting device). For example, one or more MSDUs 420 may be received from an upper layer 408 (such as higher layers). A transmitting deice may encapsulate the MSDUs 420 in one or more MPDUs 416. The transmitting device may transmit the MPDUs carried in PPDUs 412 and send the packet over the air. Overhead (such as values of overhead fields 410 that are either known or obtainable by the receiver in advance of receiving the packet) may be added along the way via a link layer, PHY layer 404, and MAC layer 406.

A wireless medium layer 402 (such as a link layer) may generate a PHY header 422 and a BA field 424, which may include one or more overhead fields 410. A PHY layer 404 may generate a PPDU 412, including a PHY header 422, a PSDU 426, and a packet extension (PE) 428. The PHY header 422 and the PE 428 may include one or more overhead fields 410. Such overhead fields 410 are described in further detail with reference to FIG. 7.

A MAC layer 406 may generate one or more MPDUs 416 (such as in one or more A-MPDUs 414) and one or more MSDUs 420 (such as in one or more A-MSDUs 418). An A-MPDU 414 (such as in a PSDU 426) may include one or more MPDUs 416, including a MAC header 430, a frame body 432, and an FCS field 434. Each MAC header 430 (such as and one or more other fields of the A-MPDU 414) may include one or more overhead fields 410. Such overhead fields 410 are described in further detail with reference to FIG. 5.

Each MPDU 416 may include an MSDU 420 (such as in the frame body 432 of the MPDU 416), such as one or more MSDUs 420 in an A-MSDU 418. Each MSDU 420 may include data from an upper layer 408 of the transmitting device. Each MSDU 420 may include one or more overhead fields 410 (such as in a frame header of the MSDU 420). Each A-MSDU 418 may include one or more overhead fields 410 in or more other fields of the A-MSDU 418. Such overhead fields 410 are described in further detail with reference to FIG. 6.

Accordingly, the receiving wireless device may detect and correct bit errors on known fields (such as overhead fields 410). By replacing one or more received values of overhead fields 410 with expected values of the overhead fields 410, the receiving wireless device may improve reliability of the system by salvaging a failed MPDU 416, such as an MPDU 416 that did not pass a MIC and/or CRC (such as when payloads are comparable in size with overhead, approximately 20-50 bytes). If relatively more values are known or determined by the receiving wireless device, the reliability (and latency) of the system may increase further, as more errors may be detected and corrected without requesting retransmission of the packet.

Figure 5:
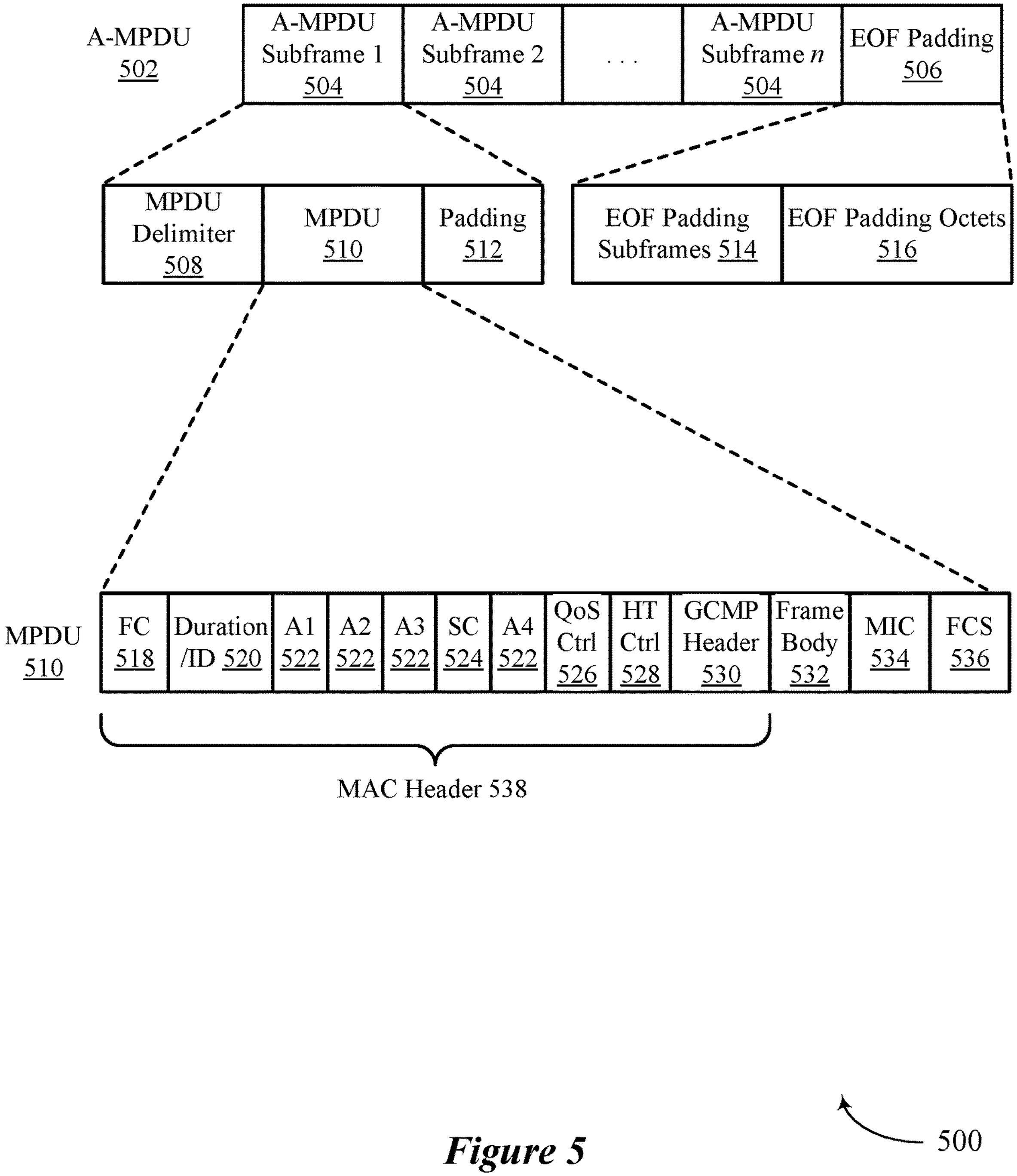
FIG. 5 shows an example of an aggregated medium access control (MAC) protocol data unit (A-MPDU) frame structure that supports error correction for increased reliability of packets.

FIG. 5 shows an example of a A-MPDU frame structure 500 that supports error correction for increased reliability of packets. The A-MPDU frame structure 500 may implement or may be implemented by aspects of the wireless communication network 100, the PDU 200, the PPDU 300, or the packet structure 400. For example, the A-MPDU frame structure 500 may be implemented by an AP 102, an STA 104, an MLD, and the like, which may be examples of the corresponding devices as described with reference to FIG. 1.

In some aspects, a receiving wireless device (such as an AP, a non-AP STA, an MLD) may receive an A-MPDU 502 in a packet. The A-MPDU 502 may include a quantity n of A-MPDU subframes 504 (such as pre-end of file (EOF) padding fields) and EOF padding 506 (such as including variable lengths in quantities of octets). The EOF padding 506 may include EOF padding subframes 514 (such as with a length of 4n octets) and 0-3 EOF padding octets 516.

An A-MPDU subframe 504 may include an MPDU delimiter 508 (such as four bit octets), an MPDU 510 (such as a variable quantity of bit octets), and padding 512 (such as 0-3 bit octets). A length field of the A-MPDU delimiter 508 may be zero or nonzero. If the length filed is zero, the transmitting device may include enough pre-EOF padding (such as in the padding 512) to satisfy a MPDU start spacing of the receiving wireless device (such as a minimum MPDU start spacing, between 0 and 16 microseconds). If the A-MPDU 502 is contained in a transport block PPDU, the MPDU start spacing may be up to 8 times higher (such as based on an MPDU MU Spacing Factor). In some examples, the transmitting device may include more pre-EOF padding (such as or EOF padding 506) than the MPDU start spacing of the receiving wireless device.

The padding (such as the EOF padding subframes 514, the EOF padding octets 516, the padding 512, MPDU delimiters 508 that are used for padding) may include bit sequences that are known by the receiving wireless device (such as values of all 0s or all 1s). For example, a transmitting device may inform the receiving wireless device of bit sequences included in the EOF padding 506. Accordingly, the EOF padding 506 may be examples of overhead fields with known or expected values. That is, the receiving wireless device may correct errors (such as corrupted or incorrect bits) received in the EOF padding 506 based on the known sequences for the EOF padding 506.

The MPDU 510 may include a MAC header 538 with a frame channel (FC) 518 (such as 2 octets), a duration/ID (such as 2 octets), one or more transmit or receive addresses 522 (such as up to 6 octets each for A1 through A4), a sequence control (SC) 524 (such as 2 octets), a QoS control 526 (such as 2 octets), an HT control 528 (such as 0 or 4 octets), and a Galois/Counter Mode with Cipher Block Chaining Message Authentication Code Protocol (GCMP) header 530 (such as 0 or 8 octets). The MPDU 510 may include one or more additional fields in a frame body 532 (such as with variable length), a MIC 534 (such as 0, 8, or 16 octets), and an FCS 536 (such as 4 octets).

One or more fields of the MAC header 538 may be overhead fields for which the receiving wireless device may know or obtain expected values, and the receiving wireless device may therefore replace one or more received values of the overhead fields with the expected values. For example, the FC 518 may have protocol version 0, or certain type/subtype combinations may be valid. Thus, if the FC 518 indicates a value other than 0, or a non-valid type/subtype combination, the receiving wireless device may replace the FC 518 with 0 or with a valid type/subtype combination.

The receiving wireless device may communicate with the transmitting device (such as prior to receiving the packet) to negotiate a value or a set of values of the duration/ID 520, the SC 524, the QoS control 526, the HT control 528, or the GCMP header 530. The receiving wireless device may therefore determine (such as obtain, identify, ascertain, or infer) if the received values of such fields are different from the negotiated values, and may replace the received values of the fields with the negotiated values or a value of the set of negotiated values (such as if the received values and the negotiated values or set of values are different).

The receiving wireless device may know or determine (such as obtain, identify, ascertain, or infer) a value for one or more addresses 522. For example, a value of A1 may be a receiver address known by the receiving wireless device. A value of A2 may be a transmitter address known by the receiving wireless device or an address from a list of transmitter addresses known by the receiving wireless device (such as at an AP side). For example, if the receiving wireless device is an AP, the AP may receive communications from a deterministic quantity of STAs associated with the AP, and the list of transmitter addresses may be transmitter addresses each associated with an STA. If the receiving wireless device is a non-AP STA, the STA may be associated with one AP, and the known transmitter address may be an address of the AP. The value of A3 may be a value known by the receiving wireless device (such as a BSSID). The value of A4 may be a source address known by the receiver. In some examples, the receiving wireless device may determine the values for the one or more addresses 522 based on received values for the one or more addresses 522 received via one or more previous packets. For example, the values of the one or more addresses 522 may be the same as a previously received value for the one or more addresses 522.

Accordingly, the receiving wireless device may determine (such as obtain, identify, ascertain, or infer) if received values of one or more fields of the A-MPDU or the MAC header 538 (such as overhead fields) are different from one or more expected values of the one or more fields (such as known, determined, or negotiated values). In other words, the receiving wireless device may detect an inconsistency in the packet. If the received are different from the expected values (such as or if one or more bits in the MAC header 538 are corrupted or inconsistent with the expected values), the receiving wireless device may replace the received values with the expected values (such as after failure of a CRC of the packet using a CRC-16 protecting the MPDU delimiter).

Figure 6:
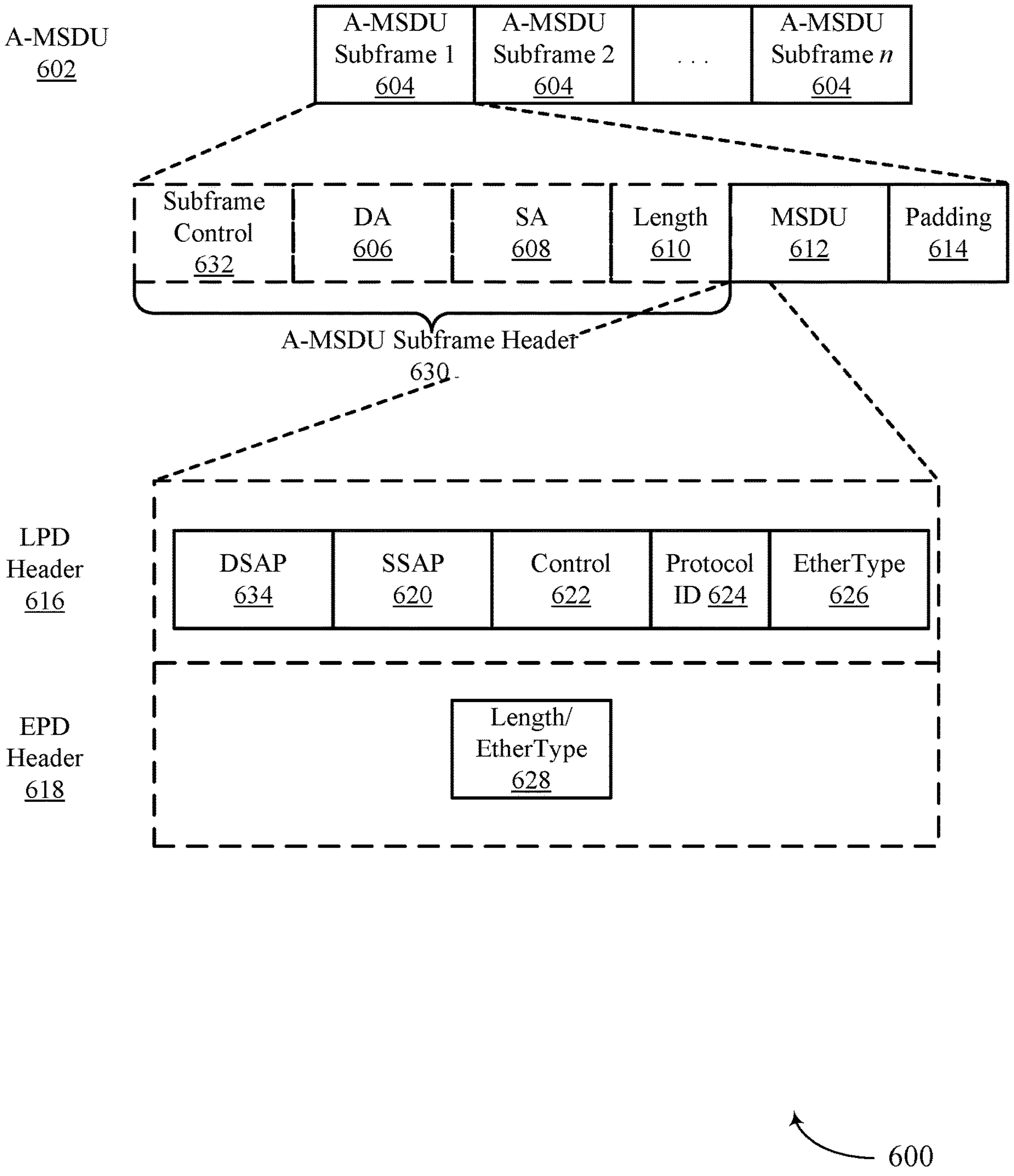
FIG. 6 shows an example of an aggregated MAC service data unit (A-MSDU) frame structure that supports error correction for increased reliability of packets.

FIG. 6 shows an example of a A-MSDU frame structure 600 that supports error correction for increased reliability of packets. The A-MSDU frame structure 600 may implement or may be implemented by aspects of the wireless communication network 100, the PDU 200, the PPDU 300, the packet structure 400, or the A-MPDU frame structure 500. For example, the A-MSDU frame structure 600 may be implemented by an AP 102, an STA 104, an MLD, and the like, which may be examples of the corresponding devices as described with reference to FIG. 1.

In some aspects, a receiving wireless device (such as an AP, a non-AP STA, an MLD) may receive an A-MSDU 602 in a packet. The A-MSDU 602 may include a quantity n of A-MSDU subframes 604. The A-MSDU subframes 604 may be basic A-MSDU subframes, short A-MSDU subframes, or dynamic A-MSDU subframes with variable A-MSDU subframe headers 630. A basic A-MSDU subframe may be used for extremely high throughput (EHT), high throughput (HT), very high throughput (VHT), or high efficiency (HE), and may include a destination address (DA) 606 (such as 6 octets) a source address (SA) 608 (such as 6 octets), a length 610 (such as 2 octets), an MSDU 612 with variable length, and padding 614 (such as 0-3 octets). A short A-MSDU subframe may be used for SIG communication and may include a length 610 (such as 2 octets), the MSDU 612 (such as 0-7920 octets), and padding 614 (such as 0-3 octets). A dynamic A-MSDU subframe may be used for directional multi-gigabit (DMG) communications and may include a subframe control 632 (such as 2 octets) a DA 606 (such as optionally 0 or 6 octets), an SA 608 (such as optionally 0 or 6 octets), the MSDU 612 (such as 0-2034 octets), and padding 614 (such as 0-3 octets).

The receiving wireless device may know or determine (such as obtain, identify, ascertain, or infer) a value for the DA 606 and the SA 608. For example, the receiving wireless device may receive one or more previous packets including one or more previous values of DAs and SAs, and the receiving wireless device may use the one or more previous values for the DAs and the SAs as expected values for the DA 606 and the SA 608. Additionally, or alternatively, the receiving wireless device may communicate with the transmitting device to negotiate expected values or a set of expected values for one or more fields of the A-MSDU subframe header 630 (such as overhead fields), such as the DA 606, the SA 608, and the length 610. Thus, corrupted or incorrect bits in such overhead fields may be detectable and correctable by the receiving wireless device.

The padding 614 may include bit sequences that are known by the receiving wireless device (such as values of all 0s or all 1s). For example, a transmitting device may inform the receiving wireless device of bit sequences included in the padding 614. Accordingly, the padding 614 may be an example of an overhead field with known or expected values. That is, the receiving wireless device may correct errors (such as corrupted or incorrect bits) received in the padding 614 based on the known sequences for the padding 614.

The MSDU 612 may include a header (such as a Logical Link Control (LLC) Packet Discrimination (LPD) header 616 or an EtherType Packet Discrimination (EPD) header 618) with overhead field values that are known or obtainable by the receiving wireless device. For example, an LPD header 616 may include a destination service access point (DSAP) 634 (such as 1 octet), a source service access point (SSAP) (such as 1 octet), a control field 622 (such as 1 octet), a protocol ID 624 (such as 3 octets), and an EtherType 626 (such as 2 octets). The DSAP 634, the SSAP 620, the control field 622, and the protocol ID 624 may have default values that are known by the receiving wireless device.

Additionally, or alternatively, values of the DSAP 634, the SSAP 620, the control field 622, the protocol ID 624, and the EtherType 626 may not change over time. The receiving wireless device may therefore use a previous value of the LPD header fields (such as overhead fields) received via one or more previous packets from the transmitting device as an expected or default value. Thus, the receiving wireless device may determine that one or more fields (such as 6 octets) of the LPD header 616 do not contain correct values (such as the default values), and may accordingly correct errors by replacing received values of the LPD header 616 with the default values.

An EPD header 618 may include a Length/EtherType 628 (such as 2 octets). In some examples, the receiving wireless device may communicate with the transmitting device to negotiate one or more values of the Length/EtherType 628. Additionally, or alternatively, the transmitting device (such as an STA) and the receiving wireless device (such as an STA) may consistently use same or slowly changing values for the Length/EtherType 628 (such as if a payload length of the MSDU is the same or slowly changing). Accordingly, the receiving wireless device may determine if the Length/EtherType 628 is an expected value (such as with one or more bits that are the same as a previously received Length/EtherType 628). If a received value of the Length/EtherType 628 does not contain an expected value, the receiving wireless device may replace the received value with the expected value. The receiving wireless device may determine the expected value, for example, using a ML model.

Accordingly, the receiving wireless device may determine if received values of one or more fields of an A-MSDU 602 or MSDU header (such as overhead fields) are different from one or more expected values of the one or more fields (such as known, determined, or negotiated values). In other words, the receiving wireless device may detect an inconsistency in the packet. If the received are different from the expected values (such as or if one or more bits in the A-MSDU or MSDU are corrupted or inconsistent with the expected values), the receiving wireless device may replace the received values with the expected values (such as after failure of a MIC or CRC of the packet).

Figure 7:
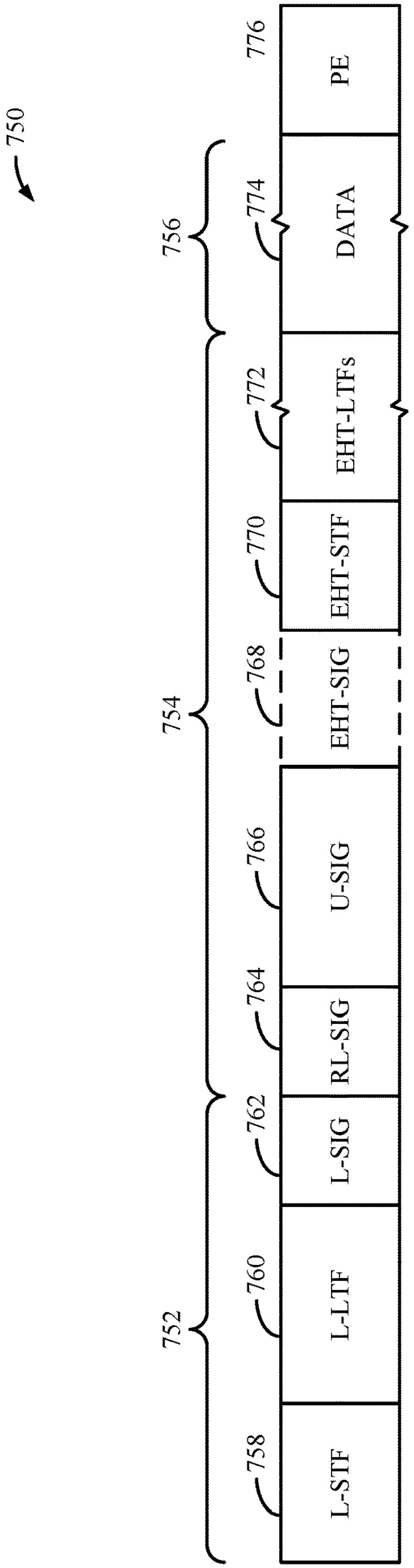
FIG. 7 shows an example physical layer (PHY) protocol data unit (PPDU) usable for communications between a wireless AP and one or more wireless STAs.

FIG. 7 shows an example PPDU 750 usable for communications between a wireless AP and one or more wireless STAs. Although the techniques herein are described and illustrated with reference to an EHT-PPDU, in some examples, the described techniques may be used to perform error correction on one or more other PPDU formats (such as a UHR PPDU, a HE PPDU, a non-HT PPDU, and so on.) For example, the AP and STAs may be examples of the AP 102 and the STAs 104 described with reference to FIG. 1. As shown, the PPDU 750 includes a PHY preamble, that includes a legacy portion 752 and a non-legacy portion 754, and a payload 756 that includes a data field 774. The legacy portion 752 of the preamble includes an L-STF 758, an L-LTF 760, and an L-SIG 762. The non-legacy portion 754 of the preamble includes a repetition of L-SIG (RL-SIG) 764 and multiple wireless communication protocol version-dependent signal fields after RL-SIG 764. For example, the non-legacy portion 754 may include a universal signal field 766 (referred to herein as "U-SIG 766") and an EHT signal field 768 (referred to herein as "EHT-SIG 768"). The presence of RL-SIG 764 and U-SIG 766 may indicate to EHT- or later version-compliant STAs 104 that the PPDU 750 is an EHT PPDU or a PPDU conforming to any later (post-EHT) version of a new wireless communication protocol conforming to a future IEEE 802.11 wireless communication protocol standard. One or both of U-SIG 766 and EHT-SIG 768 may be structured as, and carry version-dependent information for, other wireless communication protocol versions associated with amendments to the IEEE family of standards beyond EHT. For example, U-SIG 766 may be used by a receiving wireless device (such as an AP 102 or a STA 104) to interpret bits in one or more of EHT-SIG 768 or the data field 774. Like L-STF 758, L-LTF 760, and L-SIG 762, the information in U-SIG 766 and EHT-SIG 768 may be duplicated and transmitted in each of the component 20 MHz channels in instances involving the use of a bonded channel.

The non-legacy portion 754 further includes an additional short training field 770 (referred to herein as "EHT-STF 770," although it may be structured as, and carry version-dependent information for, other wireless communication protocol versions beyond EHT) and one or more additional long training fields 772 (referred to herein as "EHT-LTFs 772," although they may be structured as, and carry version-dependent information for, other wireless communication protocol versions beyond EHT). EHT-STF 770 may be used for timing and frequency tracking and AGC, and EHT-LTF 772 may be used for more refined channel estimation.

If the PPDU 750 has an EHT multi-user (MU) PPDU format, the PPDU 750 may include an EHT-SIG 768. The EHT-SIG 768 may be used by an AP 102 to identify and inform one or multiple STAs 104 that the AP 102 has scheduled uplink (UL) or downlink (DL) resources for them. EHT-SIG 768 may be decoded by each compatible STA 104 served by the AP 102. EHT-SIG 768 may generally be used by the receiving wireless device to interpret bits in the data field 774. For example, EHT-SIG 768 may include resource unit (RU) allocation information, spatial stream configuration information, and per-user (such as STA-specific) signaling information. Each EHT-SIG 768 may include a common field and at least one user-specific field. If the PPDU 750 has an EHT TB PPDU format, the PPDU 750 may not include the EHT-SIG 768.

In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 774. In some examples, the PPDU 750 may include a packet extension (PE) field 776 (such as appended at the end of the PPDU 750).

In some aspects, a receiving wireless device (such as an AP, STA, or MLD receiving the PPDU 750 from a transmitting device) may determine (such as obtain, identify, ascertain, or infer) one or more expected values for fields in the PPDU 750. For example, the receiving wireless device may determine one or more fields (such as overhead fields) in a PHY header of the PPDU 750 that are predictable. The receiving wireless device may communicate with the transmitting device (such as prior to receiving the packet) to negotiate known values of one or more parameters (such as an L-SIG length, a DataRate, a number of spatial streams, and the like). The receiving wireless device may determine expected values for the overhead fields based on the negotiated parameters.

In some aspects, the receiving wireless device may obtain the expected values for one or more fields of the PPDU 750 based on one or more packets received prior to the PPDU 750. For example, the receiving wireless device may determine (such as obtain, identify, ascertain, or infer) a previous value of one or more fields of the PHY header of the one or more previous packets. The receiving wireless device may accordingly replace one or more incorrect or corrupted bits of the PPDU 750 with the previous value (such as if there is an inconsistency in the packet).

Additionally, or alternatively, the receiving wireless device may determine that one or more fields of the PHY header are changing (such as changing slowly with time). The receiving wireless device may determine a new expected value for the one or more fields based on the previous value. For example, the receiving wireless device may determine that one or more most significant bits of overhead fields in the PHY header may be the same as one or more previously-received most significant bits of overhead fields in a previously-received PHY header. Additionally, or alternatively, the receiving wireless device may use a ML model to determine the expected values (such as using the received values as inputs).

Accordingly, the receiving wireless device may determine if received values of one or more fields of the PPDU header 750 (such as overhead fields) are different from one or more expected values of the one or more fields (such as known, determined, or negotiated values). In other words, the receiving wireless device may detect an inconsistency in the packet. If the received are different from the expected values (such as or if one or more bits in the PPDU 750 are corrupted or inconsistent with the expected values), the receiving wireless device may replace the received values with the expected values (such as after failure of a CRC of the packet using a CRC-4 or a CRC-8 protecting the of L-SIG, EHT SIG, U-SIG, SIG-B, and so on).

Figure 8:
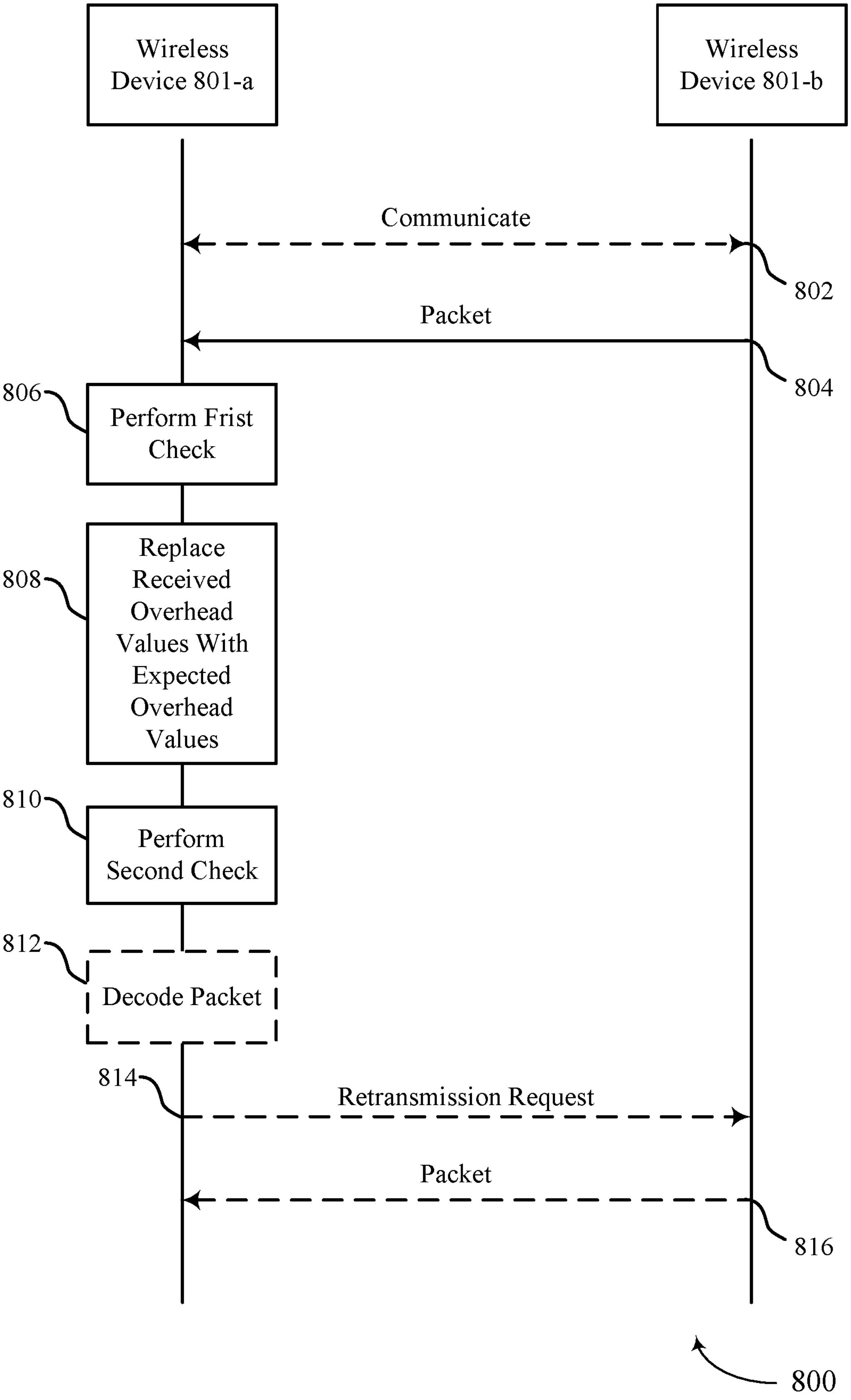
FIG. 8 shows an example of a process flow that supports error correction for increased reliability of packets.

FIG. 8 shows an example of a process flow 800 that supports error correction for increased reliability of packets. The process flow 800 may implement or may be implemented by aspects of the wireless communication network 100, the PDU 200, the PPDU 300, the packet structure 400, or the A-MPDU frame structure 500. For example, the process flow 800 may be implemented by one or more wireless devices 801 (such as a wireless device 801-*a* and a wireless device 801-*b*), which may be examples of APs 102, STAs 104, MLDs, and the like, as described with reference to FIG. 1.

In the following description of the process flow 800, the operations between the wireless device 801-*a* and the wireless device 801-*b* may occur in a different order than the example order shown and, in some examples, may be performed by one or more different devices other than those shown as examples. Some operations also may be omitted from the process flow 800, and other operations may be added to the process flow 800. Further, although some operations or signaling may be shown to occur at different times for discussion purposes, these operations may actually occur at the same time.

In some examples, at 802, the wireless device 801-*a* and the wireless device 801-*b* may communicate in a wireless network. For example, the wireless device 801-*a* and the wireless device 801-*b* may exchange signaling (such as management-based exchanges) to negotiate one or more parameter values for communications between the wireless device 801-*a* and the wireless device 801-*b*. In some examples, the wireless device 801-*a* may receive one or more packets from the wireless device 801-*b* including previous values for one or more fields of the packets (such as overhead fields).

At 804, the wireless device 801-*a* may obtain a packet from the wireless device 801-*b*. The packet may be a data packet, a control or management packet, one or more frames, or any other packet including one or more data fields (such as fields comprising data from an upper layer) and one or more overhead fields (such as fields different from the data fields, for example frame header fields, padding, redundancy fields, information added by a PHY layer, information added by a MAC layer, information added by a link layer). The overhead fields may indicate one or more received values of the overhead fields.

The overhead fields may include one or more of a receiver MAC address, a transmitter MAC address, a BSSID, a DA, an SA, padding, overhead introduced due to an LPD header, an EDP, a frame control field, a length, overhead introduced due to transmission control protocol (TCP), overhead introduced due to UDP, overhead introduced due to LAS, overhead introduced to IP, an application field, an MPDU delimiter, an L-SIG length, a data rate, QoS control, HT control, GCMP length, and/or a duration/ID. In some examples, the overhead fields may include some other information or parameters known or obtainable by the wireless device 801-*a*.

At 806, the wireless device 801-*a* may perform a first check on the packet. The first check may be a MIC (such as using an MIC field of the packet) or a CRC (such as using an FCS field of the packet). Additionally, or alternatively, the first check may include a check using one or more other fields (such as a CRC-16, a CRC-4, a CRC-8, parity fields, and so on). In some examples, the first check may indicate an inconsistency in receiving the packet. For example, the first check may indicate that one or more bits of the packet are corrupted or incorrect.

At 808, the wireless device 801-*a* may replace the one or more received values of the overhead fields with one or more expected values of the overhead fields (such as based on determining that the received values are different from the expected values). In some examples, the expected values may be based on (such as in accordance with) the negotiated parameters. In some examples, the expected values may be default values.

Additionally, or alternatively, the wireless device 801-*a* may obtain the expected values from the one or more previous values for the overhead fields (such as received prior to receiving the packet). For example, the expected values may be the previous values. In some examples, the wireless device 801-*a* may determine (such as predict) the expected values based on an expected change in the previous values. In some examples, the wireless device 801-*a* may generate the expected values using an ML model (such as an ML model trained to generate predicted values for the overhead fields).

In some examples, at 810, the wireless device 801-*a* may perform a second check on the packet. For example, the wireless device 801-*a* may perform a second MIC using the MIC value and/or a second CRC using the FCS value. The wireless device 801-*a* may process the packet based on an outcome of the second check.

For example, at 812, if the second check is successful, the wireless device 801-*a* may decode the packet. At 814, if the second check indicates an error (such as an inconsistency) in the packet, the wireless device 801-*a* may transmit a request to the wireless device 801-*a* for a retransmission of the packet. At 816, the wireless device 801-*b* may output a retransmission of the packet to the wireless device 801-*a* in response to the request.

Figure 9:
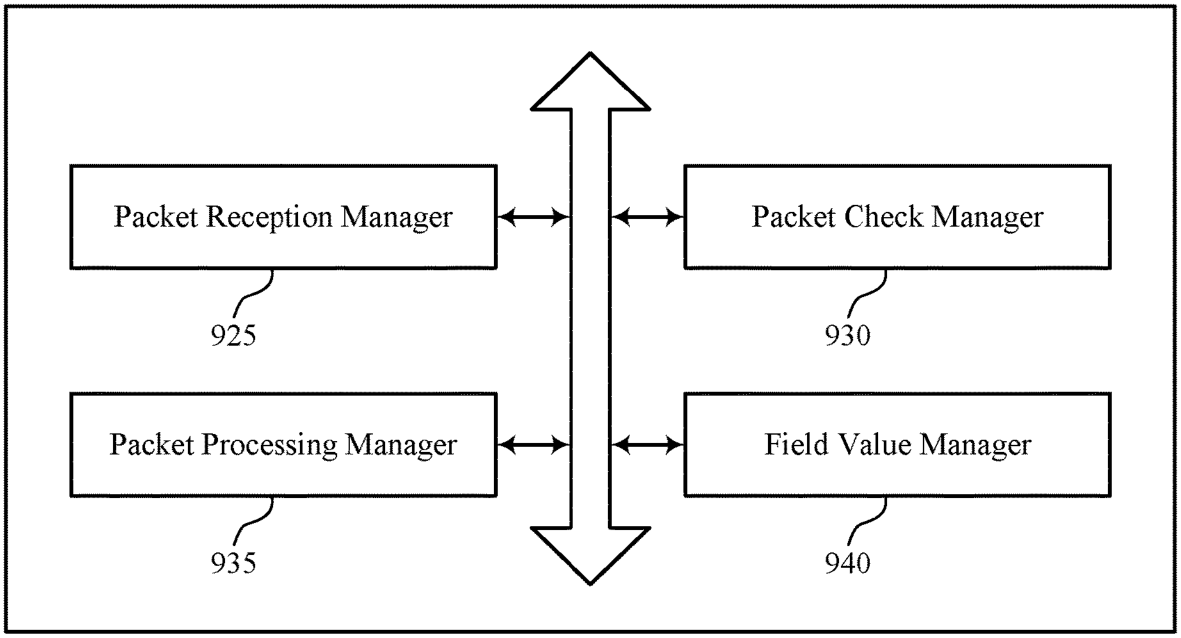
FIG. 9 shows a block diagram of an example wireless communication device that supports error correction for increased reliability of packets.

In some examples, the wireless device 801-*a* may not perform a second check on the packet. For example, FIG. 9 shows a block diagram of an example wireless communication device 900 (such as an AP, a non-AP STA, an MLD, and the like) that supports error correction for increased reliability of packets. In some examples, the wireless communication device 900 is configured to perform the processes 1000, 1100, and 1200 described with reference to FIGS. 10, 11, and 12, respectively. The wireless communication device 900 may include one or more chips, SoCs, chipsets, packages, components or devices that individually or collectively constitute or include a processing system. The processing system may interface with other components of the wireless communication device 900, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 900 may transmit the information output from the chip. In such an example, the second interface may refer to an interface between the processing system of the chip and a reception component, such that the wireless communication device 900 may receive information that is then passed to the processing system. In some such examples, the first interface also may obtain information, such as from the transmission component, and the second interface also may output information, such as to the reception component.

The processing system of the wireless communication device 900 includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as “processors” or collectively as “the processor” or “the processor circuitry”). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as “memories” or collectively as “the memory” or “the memory circuitry”). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively “the radio”), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 900 can be configurable or configured for use in an AP, such as the AP 102 described with reference to FIG. 1. In some other examples, the wireless communication device 900 can be an AP that includes such a processing system and other components including multiple antennas. The wireless communication device 900 is capable of transmitting and receiving wireless communications in the form of, for example, wireless packets. For example, the wireless communication device 900 can be configurable or configured to transmit and receive packets in the form of physical layer PPDUs and MPDUs conforming to one or more of the IEEE 802.11 family of wireless communication protocol standards. In some other examples, the wireless communication device 900 can be configurable or configured to transmit and receive signals and communications conforming to one or more 3GPP specifications including those for 5G NR or 6G. In some examples, the wireless communication device 900 also includes or can be coupled with one or more application processors which may be further coupled with one or more other memories. In some examples, the wireless communication device 900 further includes at least one external network interface coupled with the processing system that enables communication with a core network or backhaul network that enables the wireless communication device 900 to gain access to external networks including the Internet.

The wireless communication device 900 includes a packet reception manager 925, a packet check manager 930, a packet processing manager 935, and a field value manager 940. Portions of one or more of the packet reception manager 925, the packet check manager 930, the packet processing manager 935, and the field value manager 940 may be implemented at least in part in hardware or firmware. For example, one or more of the packet reception manager 925, the packet check manager 930, the packet processing manager 935, and the field value manager 940 may be implemented at least in part by at least a processor or a modem. In some examples, portions of one or more of the packet reception manager 925, the packet check manager 930, the packet processing manager 935, and the field value manager 940 may be implemented at least in part by a processor and software in the form of processor-executable code stored in memory.

The wireless communication device 900 may support wireless communications in accordance with examples as disclosed herein. The packet reception manager 925 is configurable or configured to receive a packet including one or more data fields and one or more overhead fields. The packet check manager 930 is configurable or configured to perform a first check on the packet, an outcome of the first check indicating an inconsistency in receiving the packet. In some examples, the packet check manager 930 is configurable or configured to perform a second check on a modified version of the packet in accordance with the outcome of the first check, where the modified version of the packet replaces a received value of an overhead field of the one or more overhead fields with an expected value of the overhead field. The packet processing manager 935 is configurable or configured to process the packet in accordance with an outcome of the second check.

In some examples, the field value manager 940 is configurable or configured to obtain the expected value of the overhead field from one or more additional packets received prior to the packet.

In some examples, to support obtaining the expected value, the field value manager 940 is configurable or configured to obtain a previous value of the overhead field via the one or more additional packets, where the expected value of the overhead field is the previous value.

In some examples, the overhead field includes one or more of a receiver MAC address, a transmitter MAC address, a BSS identifier, a destination address, a source address, padding, overhead introduced due to LPD header, an EPD, a frame control field, a length field, overhead introduced due to TPC, overhead introduced due to UDP, overhead introduced due to LAS, overhead introduced due to IP, an application field, or a MPDU delimiter.

In some examples, to support obtaining the expected value, the field value manager 940 is configurable or configured to obtain one or more previous values of the overhead field via the one or more additional packets, where the expected value of the overhead field is in accordance with an expected change from the one or more previous values.

In some examples, the overhead field includes one or more of a legacy signal (L-SIG) length field, a data rate field, or a length field.

In some examples, the field value manager 940 is configurable or configured to predict a value of the overhead field in accordance with the one or more previous values, where the expected value of the overhead field is the predicted value.

In some examples, the field value manager 940 is configurable or configured to train a machine learning model to learn the predicted value of the overhead field. In some examples, the field value manager 940 is configurable or configured to obtain the predicted value of the overhead field in accordance with the machine learning model.

In some examples, the field value manager 940 is configurable or configured to communicate with a second wireless device to negotiate one or more communication parameters for transmissions from the second wireless device to the first wireless device, where the expected value of the overhead field is in accordance with the one or more communication parameters.

In some examples, the overhead field indicates a communication parameter of the one or more communication parameters, the overhead field including one or more of a QoS control, a HT control, a GCMP length, a length, a L-SIG length, a data rate, or a duration/ID.

In some examples, one or more of the first check or the second check includes one or more of a message integrity check in accordance with a message integrity check field of the packet or a cyclic redundancy check in accordance with a frame check sequence field of the packet.

In some examples, decoding the packet in accordance with a success of the second check. In some examples, requesting a retransmission of the packet in accordance with an outcome of the second check indicating an error in the packet.

Figure 10:
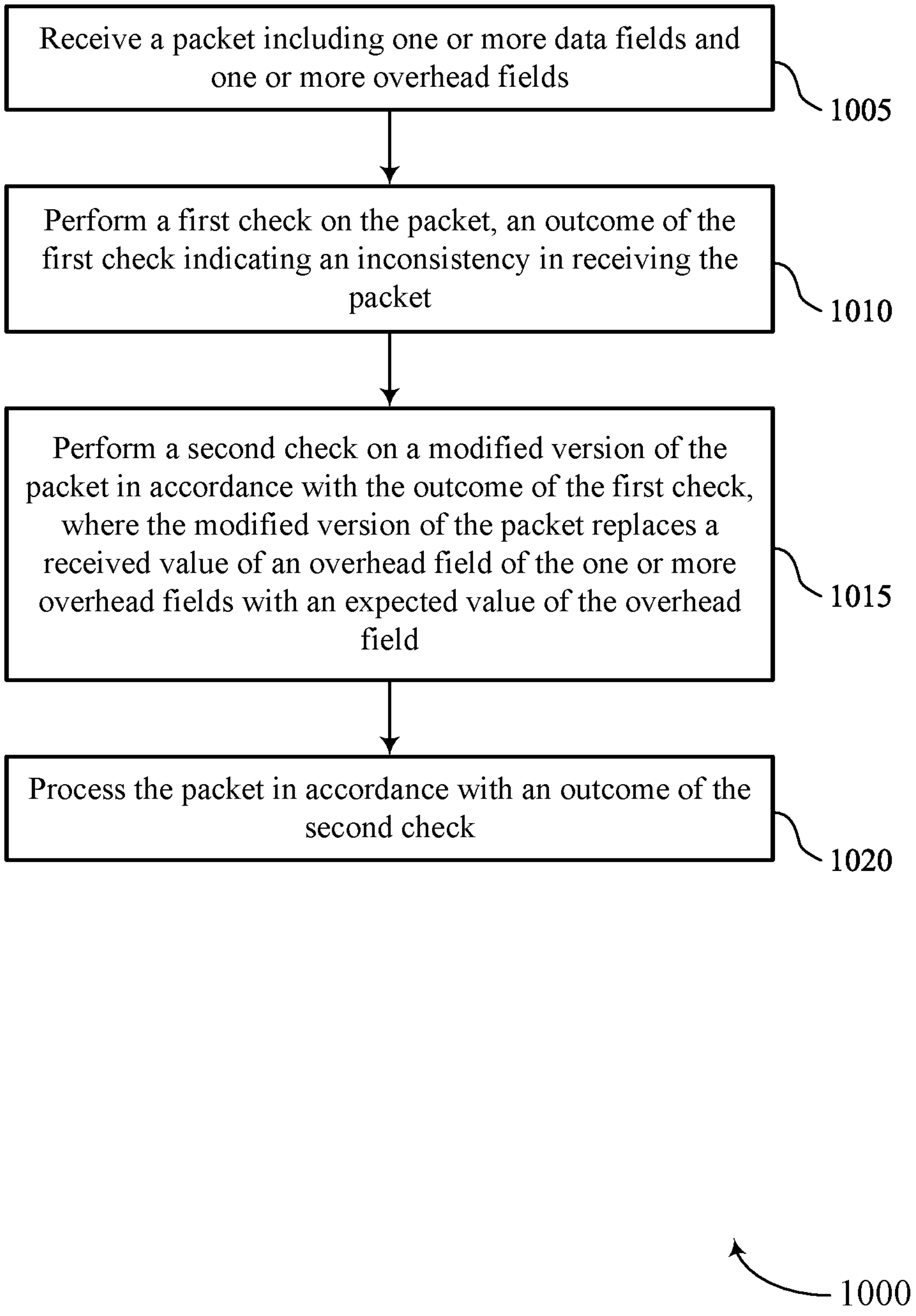
FIG. 10 through 12 show flowcharts illustrating example processes performable by or at a first wireless device in a wireless network that supports error correction for increased reliability of packets.

FIG. 10 shows a flowchart illustrating an example process 1000 performable by or at a first wireless device in a wireless network that supports error correction for increased reliability of packets. The operations of the process 1000 may be implemented by a first wireless device in a wireless network or its components as described herein. For example, the process 1000 may be performed by a wireless communication device, such as the wireless communication device 900 described with reference to FIG. 9, operating as or within a wireless AP. In some examples, the process 1000 may be performed by a wireless AP, such as one of the APs 102 described with reference to FIG. 1.

In some examples, in 1005, the first wireless device in a wireless network may receive a packet including one or more data fields and one or more overhead fields. The operations of 1005 may be performed in accordance with examples as disclosed herein. In some implementations, aspects of the operations of 1005 may be performed by a packet reception manager 925 as described with reference to FIG. 9.

In some examples, in 1010, the first wireless device in a wireless network may perform a first check on the packet, an outcome of the first check indicating an inconsistency in receiving the packet. The operations of 1010 may be performed in accordance with examples as disclosed herein. In some implementations, aspects of the operations of 1010 may be performed by a packet check manager 930 as described with reference to FIG. 9.

In some examples, in 1015, the first wireless device in a wireless network may perform a second check on a modified version of the packet in accordance with the outcome of the first check, where the modified version of the packet replaces a received value of an overhead field of the one or more overhead fields with an expected value of the overhead field. The operations of 1015 may be performed in accordance with examples as disclosed herein. In some implementations, aspects of the operations of 1015 may be performed by a packet check manager 930 as described with reference to FIG. 9.

In some examples, in 1020, the first wireless device in a wireless network may process the packet in accordance with an outcome of the second check. The operations of 1020 may be performed in accordance with examples as disclosed herein. In some implementations, aspects of the operations of 1020 may be performed by a packet processing manager 935 as described with reference to FIG. 9.

Figure 11:
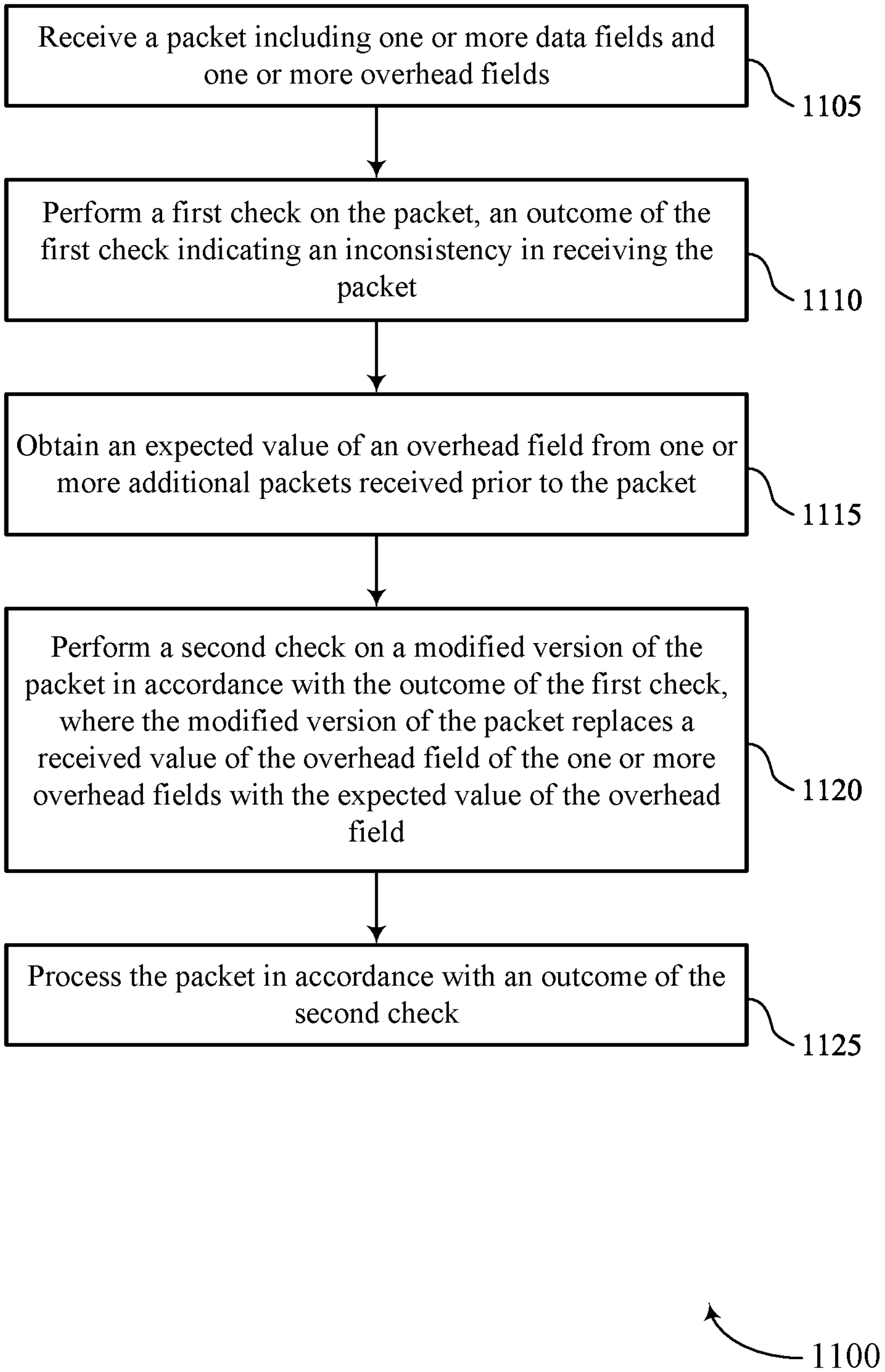

FIG. 11 shows a flowchart illustrating an example process 1100 performable by or at a first wireless device in a wireless network that supports error correction for increased reliability of packets. The operations of the process 1100 may be implemented by a first wireless device in a wireless network or its components as described herein. For example, the process 1100 may be performed by a wireless communication device, such as the wireless communication device 900 described with reference to FIG. 9, operating as or within a wireless AP. In some examples, the process 1100 may be performed by a wireless AP, such as one of the APs 102 described with reference to FIG. 1.

In some examples, in 1105, the first wireless device in a wireless network may receive a packet including one or more data fields and one or more overhead fields. The operations of 1105 may be performed in accordance with examples as disclosed herein. In some implementations, aspects of the operations of 1105 may be performed by a packet reception manager 925 as described with reference to FIG. 9.

In some examples, in 1110, the first wireless device in a wireless network may perform a first check on the packet, an outcome of the first check indicating an inconsistency in receiving the packet. The operations of 1110 may be performed in accordance with examples as disclosed herein. In some implementations, aspects of the operations of 1110 may be performed by a packet check manager 930 as described with reference to FIG. 9.

In some examples, in 1115, the first wireless device in a wireless network may obtain an expected value of an overhead field from one or more additional packets received prior to the packet. The operations of 1115 may be performed in accordance with examples as disclosed herein. In some implementations, aspects of the operations of 1115 may be performed by a field value manager 940 as described with reference to FIG. 9.

In some examples, in 1120, the first wireless device in a wireless network may perform a second check on a modified version of the packet in accordance with the outcome of the first check, where the modified version of the packet replaces a received value of the overhead field of the one or more overhead fields with the expected value of the overhead field. The operations of 1120 may be performed in accordance with examples as disclosed herein. In some implementations, aspects of the operations of 1120 may be performed by a packet check manager 930 as described with reference to FIG. 9.

In some examples, in 1125, the first wireless device in a wireless network may process the packet in accordance with an outcome of the second check. The operations of 1125 may be performed in accordance with examples as disclosed herein. In some implementations, aspects of the operations of 1125 may be performed by a packet processing manager 935 as described with reference to FIG. 9.

Figure 12:
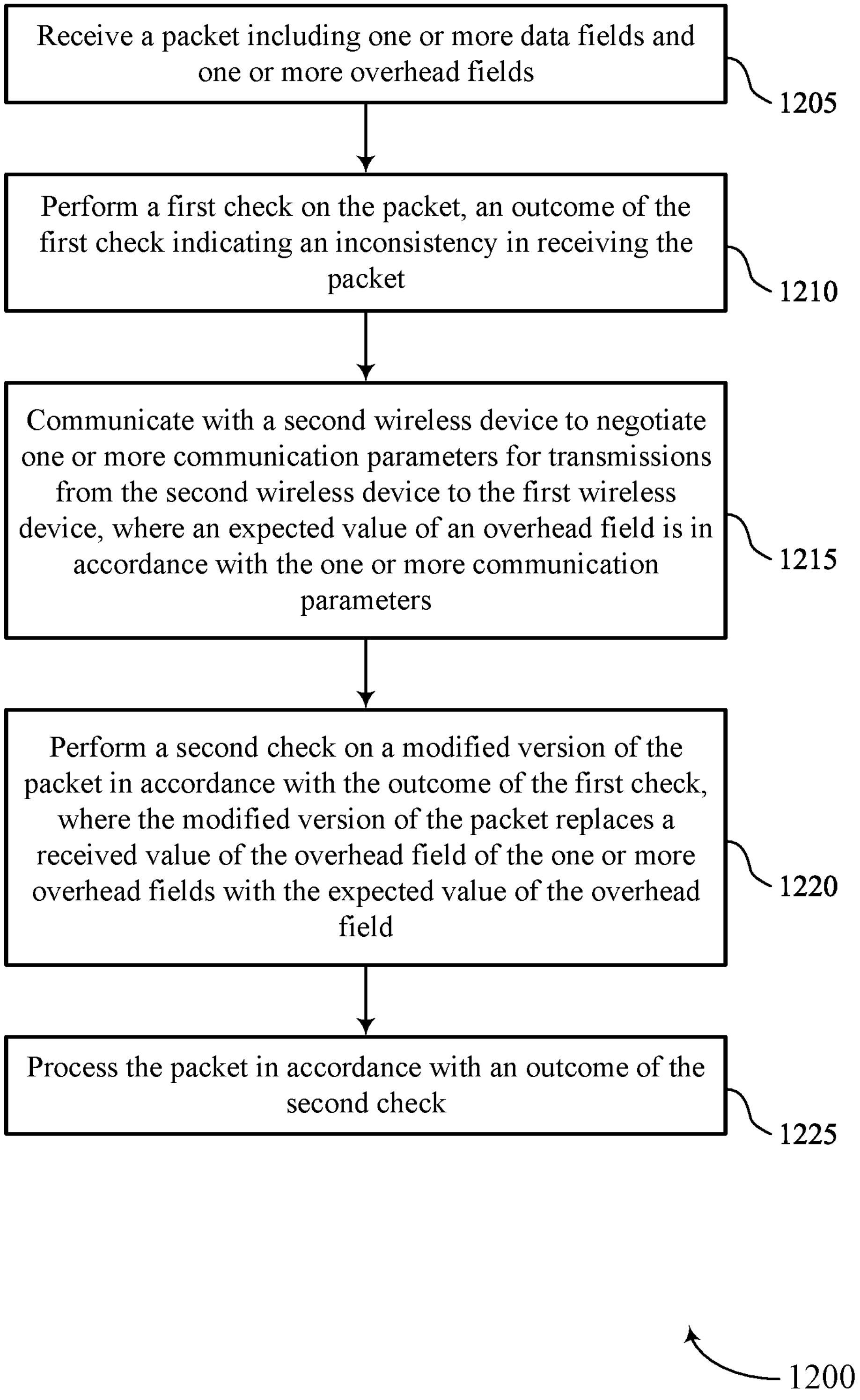

FIG. 12 shows a flowchart illustrating an example process 1200 performable by or at a first wireless device in a wireless network that supports error correction for increased reliability of packets. The operations of the process 1200 may be implemented by a first wireless device in a wireless network or its components as described herein. For example, the process 1200 may be performed by a wireless communication device, such as the wireless communication device 900 described with reference to FIG. 9, operating as or within a wireless AP. In some examples, the process 1200 may be performed by a wireless AP, such as one of the APs 102 described with reference to FIG. 1.

In some examples, in 1205, the first wireless device in a wireless network may receive a packet including one or more data fields and one or more overhead fields. The operations of 1205 may be performed in accordance with examples as disclosed herein. In some implementations, aspects of the operations of 1205 may be performed by a packet reception manager 925 as described with reference to FIG. 9.

In some examples, in 1210, the first wireless device in a wireless network may perform a first check on the packet, an outcome of the first check indicating an inconsistency in receiving the packet. The operations of 1210 may be performed in accordance with examples as disclosed herein. In some implementations, aspects of the operations of 1210 may be performed by a packet check manager 930 as described with reference to FIG. 9.

In some examples, in 1215, the first wireless device in a wireless network may communicate with a second wireless device to negotiate one or more communication parameters for transmissions from the second wireless device to the first wireless device, where an expected value of an overhead field is in accordance with the one or more communication parameters. The operations of 1215 may be performed in accordance with examples as disclosed herein. In some implementations, aspects of the operations of 1215 may be performed by a field value manager 940 as described with reference to FIG. 9.

In some examples, in 1220, the first wireless device in a wireless network may perform a second check on a modified version of the packet in accordance with the outcome of the first check, where the modified version of the packet replaces a received value of the overhead field of the one or more overhead fields with the expected value of the overhead field. The operations of 1220 may be performed in accordance with examples as disclosed herein. In some implementations, aspects of the operations of 1220 may be performed by a packet check manager 930 as described with reference to FIG. 9.

In some examples, in 1225, the first wireless device in a wireless network may process the packet in accordance with an outcome of the second check. The operations of 1225 may be performed in accordance with examples as disclosed herein. In some implementations, aspects of the operations of 1225 may be performed by a packet processing manager 935 as described with reference to FIG. 9.

Implementation examples are described in the following numbered clauses:

The following provides an overview of aspects of the present disclosure:

Aspect 1: A method for wireless communications by a first wireless device in a wireless network, comprising: receiving a packet including one or more data fields and one or more overhead fields; performing a first check on the packet, an outcome of the first check indicating an inconsistency in receiving the packet; performing a second check on a modified version of the packet in accordance with the outcome of the first check, where the modified version of the packet replaces a received value of an overhead field of the one or more overhead fields with an expected value of the overhead field; and processing the packet in accordance with an outcome of the second check.

Aspect 2: The method of aspect 1, further comprising: obtaining the expected value of the overhead field from one or more additional packets received prior to the packet.

Aspect 3: The method of aspect 2, where obtaining the expected value comprises: obtaining a previous value of the overhead field via the one or more additional packets, where the expected value of the overhead field is the previous value.

Aspect 4: The method of aspect 3, where the overhead field includes one or more of a receiver MAC address, a transmitter MAC address, a BSSID, a destination address, a source address, padding, overhead introduced due to LPD header, an EPD, a frame control field, a length field, overhead introduced due to TPC, overhead introduced due to UDP, overhead introduced due to LAS, overhead introduced due to IP, an application field, or a MPDU delimiter.

Aspect 5: The method of any of aspects 2 through 4, where obtaining the expected value comprises: obtaining one or more previous values of the overhead field via the one or more additional packets, where the expected value of the overhead field is in accordance with an expected change from the one or more previous values.

Aspect 6: The method of aspect 5, where the overhead field includes one or more of a L-SIG length, a data rate, or a length.

Aspect 7: The method of any of aspects 5 through 6, further comprising: predicting a value of the overhead field in accordance with the one or more previous values, where the expected value of the overhead field is the predicted value.

Aspect 8: The method of aspect 7, further comprising: training a machine learning model to learn the predicted value of the overhead field; and obtaining the predicted value of the overhead field in accordance with the machine learning model.

Aspect 9: The method of any of aspects 1 through 8, further comprising: communicating with a second wireless device to negotiate one or more communication parameters for transmissions from the second wireless device to the first wireless device, where the expected value of the overhead field is in accordance with the one or more communication parameters.

Aspect 10: The method of aspect 9, where the overhead field indicates a communication parameter of the one or more communication parameters, the overhead field including one or more of a QoS control, a HT control, a GCMP, a length, a L-SIG length, a data rate, or a duration/ID.

Aspect 11: The method of any of aspects 1 through 10, where one or more of the first check or the second check includes one or more of a message integrity check in accordance with a message integrity check field of the packet or a cyclic redundancy check in accordance with a frame check sequence field of the packet.

Aspect 12: The method of any of aspects 1 through 11, where processing the packet includes one or more of decoding the packet in accordance with a success of the second check; or requesting a retransmission of the packet in accordance with an outcome of the second check indicating an error in the packet.

Aspect 13: A first wireless device in a wireless network for wireless communications, comprising one or more memories storing processor-executable code, and one or more processors coupled with the one or more memories and individually or collectively operable to execute the code to cause the first wireless device in a wireless network to perform a method of any of aspects 1 through 12.

Aspect 14: A first wireless device in a wireless network for wireless communications, comprising at least one means for performing a method of any of aspects 1 through 12.

Aspect 15: A non-transitory computer-readable medium storing code for wireless communications, the code comprising instructions executable by one or more processors to perform a method of any of aspects 1 through 12.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless device in a wireless network, comprising:

a processing system that includes processor circuitry and memory circuitry that stores code, the processing system configured to cause the first wireless device in the wireless network to:

receive a packet including one or more data fields and one or more overhead fields;

perform a first check on the packet, an outcome of the first check indicating an inconsistency in receiving the packet;

perform a second check on a modified version of the packet in accordance with the outcome of the first check, wherein the modified version of the packet replaces a received value of an overhead field of the one or more overhead fields with an expected value of the overhead field, wherein the expected value of the overhead field is in accordance with one or more prior communications; and process the packet in accordance with an outcome of the second check.

2. The first wireless device in the wireless network of claim 1, wherein the one or more prior communications comprise one or more additional packets received prior to the packet, and wherein the processing system is further configured to cause the first wireless device in the wireless network to:

obtain the expected value of the overhead field from the one or more additional packets.

3. The first wireless device in the wireless network of claim 2, wherein, to obtain the expected value, the processing system is configured to cause the first wireless device in the wireless network to:

obtain a previous value of the overhead field via the one or more additional packets, wherein the expected value of the overhead field is the previous value.

4. The first wireless device in the wireless network of claim 3, wherein the overhead field includes one or more of:

a receiver medium access control (MAC) address, a transmitter MAC address, a basic service set (BSS) identifier, a destination address, a source address, padding, overhead introduced due to (Logical Link Control (LLC) Protocol Discrimination (LPD) header, an EtherType Protocol Discrimination (EPD), a frame control field, a length field, overhead introduced due to transmission control protocol (TPC), overhead introduced due to user datagram protocol (UDP), overhead introduced due to low latency low loss scalable throughput (L4S), overhead introduced due to internet protocol (IP), an application field, or a medium access control (MAC) protocol data unit (MPDU) delimiter.

5. The first wireless device in the wireless network of claim 2, wherein, to obtain the expected value, the processing system is configured to cause the first wireless device in the wireless network to:

obtain one or more previous values of the overhead field via the one or more additional packets, wherein the expected value of the overhead field is in accordance with an expected change from the one or more previous values.

6. The first wireless device in the wireless network of claim 5, wherein the overhead field includes one or more of:

a legacy signal (L-SIG) length, a data rate, or a length.

7. The first wireless device in the wireless network of claim 5, wherein the processing system is further configured to cause the first wireless device in the wireless network to:

predict a value of the overhead field in accordance with the one or more previous values, wherein the expected value of the overhead field is the predicted value.

8. The first wireless device in the wireless network of claim 7, wherein the processing system is further configured to cause the first wireless device in the wireless network to:

train a machine learning model to learn the predicted value of the overhead field; and obtain the predicted value of the overhead field in accordance with the machine learning model.

9. The first wireless device in the wireless network of claim 1, wherein the processing system is further configured to cause the first wireless device in the wireless network to:

communicate, as part of the one or more prior communications, with a second wireless device to negotiate one or more communication parameters for transmissions from the second wireless device to the first wireless device, wherein the expected value of the overhead field is in accordance with the one or more communication parameters.

10. The first wireless device in the wireless network of claim 9, wherein the overhead field indicates a communication parameter of the one or more communication parameters, the overhead field including one or more of:

a quality of service (QoS) control, a high throughout (HT) control, a Galois/Counter Mode with Cipher Block Chaining Message Authentication Code Protocol (GCMP), a length, a legacy signal (L-SIG) length, a data rate, a duration, or an identifier (ID).

11. The first wireless device in the wireless network of claim 1, wherein one or more of the first check or the second check includes one or more of: a message integrity check in accordance with a message integrity check field of the packet or a cyclic redundancy check in accordance with a frame check sequence field of the packet.

12. The first wireless device in the wireless network of claim 1, wherein, to process the packet, the processing system is further configured to cause the first wireless device in the wireless network to:

decode the packet in accordance with a success of the second check;

request a retransmission of the packet in accordance with an outcome of the second check indicating an error in the packet; or both.

13. A method for wireless communications by a first wireless device in a wireless network, comprising:

receiving a packet including one or more data fields and one or more overhead fields;

performing a first check on the packet, an outcome of the first check indicating an inconsistency in receiving the packet;

performing a second check on a modified version of the packet in accordance with the outcome of the first check, wherein the modified version of the packet replaces a received value of an overhead field of the one or more overhead fields with an expected value of the overhead field, wherein the expected value of the overhead field is in accordance with one or more prior communications; and processing the packet in accordance with an outcome of the second check.

14. The method of claim 13, wherein the one or more prior communications comprise one or more additional packets received prior to the packet, and further comprising:

obtaining the expected value of the overhead field from the one or more additional packets.

15. The method of claim 14, wherein obtaining the expected value comprises:

obtaining a previous value of the overhead field via the one or more additional packets, wherein the expected value of the overhead field is the previous value.

16. The method of claim 14, wherein obtaining the expected value comprises:

obtaining one or more previous values of the overhead field via the one or more additional packets, wherein the expected value of the overhead field is in accordance with an expected change from the one or more previous values.

17. The method of claim 13, further comprising:

communicating, as part of the one or more prior communications, with a second wireless device to negotiate one or more communication parameters for transmissions from the second wireless device to the first wireless device, wherein the expected value of the overhead field is in accordance with the one or more communication parameters.

18. The method of claim 17, wherein the overhead field indicates a communication parameter of the one or more communication parameters, the overhead field including one or more of a quality of service (QoS) control, a high throughout (HT) control, a Galois/Counter Mode with Cipher Block Chaining Message Authentication Code Protocol (GCMP), a length, a legacy signal (L-SIG) length, a data rate, a duration, or an identifier (ID).

19. The method of claim 13, wherein one or more of the first check or the second check includes one or more of a message integrity check in accordance with a message integrity check field of the packet or a cyclic redundancy check in accordance with a frame check sequence field of the packet.

20. The method of claim 13, wherein processing the packet includes one or more of:

decoding the packet in accordance with a success of the second check; or requesting a retransmission of the packet in accordance with an outcome of the second check indicating an error in the packet.

* * * * *